(12) United States Patent
Ahn et al.

(10) Patent No.: US 7,196,759 B2
(45) Date of Patent: Mar. 27, 2007

(54) IN-PLANE SWITCHING MODE LIQUID CRYSTAL DISPLAY DEVICE AND METHOD OF FABRICATION THEREOF

(75) Inventors: Byung-Chul Ahn, Annyang-si (KR); Woong-Kwon Kim, Gunpo-si (KR)

(73) Assignee: LG.Philips LCD Co., Ltd, Seoul (KR)

( * ) Notice: Subject to any disclaimer, the term of this patent is extended or adjusted under 35 U.S.C. 154(b) by 290 days.

(21) Appl. No.: 10/878,037

(22) Filed: Jun. 29, 2004

(65) Prior Publication Data

US 2004/0263754 A1 Dec. 30, 2004

(30) Foreign Application Priority Data

Jun. 30, 2003 (KR) .................... 10-2003-0043466

(51) Int. Cl.
*G02F 1/1343* (2006.01)
*G02F 1/1335* (2006.01)

(52) U.S. Cl. .................... 349/141; 349/106; 349/143

(58) Field of Classification Search ............... 349/141, 349/143, 106, 139
See application file for complete search history.

(56) References Cited

U.S. PATENT DOCUMENTS 6,900,856 B2* 5/2005 Kim et al. .................... 349/44

* cited by examiner

*Primary Examiner*—Dung T. Nguyen
(74) *Attorney, Agent, or Firm*—McKenna Long & Aldridge LLP

(57) ABSTRACT

An in-plane switching mode liquid crystal display device includes, among other features, a gate line, a common line, a data line, a thin film transistor connected to the gate line and the data line, a drain electrode, a first insulating layer to cover the entire surface of a first substrate except a pixel region and portions of the drain electrode and the common line; a first pixel line layer connected to the drain electrode and on a side of the first insulating layer, a first common line layer connected to the common line and on a side of the first insulating layer, a second insulating layer in a region that is not covered by the first insulating layer, a second pixel line layer on the second insulating layer and connected to the first pixel line layer, and a second common line layer on the second insulating layer and connected on the first common line layer.

45 Claims, 22 Drawing Sheets

IN-PLANE SWITCHING MODE LIQUID CRYSTAL DISPLAY DEVICE AND METHOD OF FABRICATION THEREOF

This application claims the benefit of Korean Patent Application No. 2003-43466, filed on Jun. 30, 2003, which is hereby incorporated by reference for all purposes as if fully set forth herein.

BACKGROUND OF THE INVENTION

1. Field of the Invention

The present invention relates to liquid crystal display devices. More particularly, the present invention relates to in-plane switching mode liquid crystal display devices that provide high-image quality and high-aperture ratio, and a fabricating method thereof.

2. Discussion of the Related Art

In general, a liquid crystal display (LCD) device uses the optical anisotropy and polarization properties of liquid crystal molecules. Liquid crystal molecules have a definite orientational alignment resulting from their thin and long shape. The alignment direction of the liquid crystal molecules can be controlled by application of an electric field to the liquid crystal molecules. Accordingly, as an intensity of the applied electric field changes, the alignment orientation of the liquid crystal molecules also changes. Because incident light through a liquid crystal material is refracted based upon an orientation of the liquid crystal molecules resulting from the optical anisotropy of the aligned liquid crystal molecules, an intensity of the incident light can be controlled and images can be displayed.

Among the various types of LCD devices commonly used, active matrix LCD (AM-LCD) devices, in which thin film transistors (TFTs) and pixel electrodes connected to the TFTs are disposed in a matrix, have been developed because of their high resolution and superior display of moving images.

The LCD device includes upper and lower substrates, and a liquid crystal layer interposed therebetween. The upper substrate, which is referred to as a color filter substrate, has a common electrode and the lower substrate, which is referred to as an array substrate, has a pixel electrode. The liquid crystal layer is driven by an electric field generated between the common electrode and the pixel electrode. The LCD device having the common electrode and the pixel electrode on opposite substrates has excellent transmittance and aperture ratio. However, because the electric field is generated perpendicular to the upper and lower substrates, the LCD device has a poor viewing angle property. To solve the problem of narrow viewing angle, new LCD devices such as an in-plane switching (IPS) mode LCD device, where an electric field is laterally generated, may be used.

FIG. 1 is a schematic cross-sectional view of an in-plane switching mode liquid crystal display device according to the related art.

In FIG. 1, an upper substrate 10 and a lower substrate 20 face to and are spaced apart from each other. A liquid crystal layer 12 is interposed between the upper and lower substrates 10 and 20. A pixel electrode 36 and a common electrode 38 are formed on an inner surface of the lower substrate 20. The liquid crystal layer 12 is driven with a horizontal electric field generated between the pixel electrode 36 and the common electrode 38.

Because the liquid crystal molecules are re-aligned along a horizontal electric field, the IPS mode LCD device has a wide viewing angle. For example, users can see images having a respective viewing angle of about 80° to about 85° along top, bottom, right and left directions with respect to a normal direction of the IPS mode LCD device.

FIGS. 2A, 2B and 3 are schematic views showing an in-plane switching mode liquid crystal display device according to the related art. FIG. 2A is a plan view showing an array substrate, and FIG. 2B is a plan view showing a color filter substrate. FIG. 3 is a cross-sectional view taken along a line "III—III" of FIGS. 2A and 2B showing the in-plane switching mode liquid crystal display device including a liquid crystal layer therein.

In FIG. 2A, a gate line 42 is formed in a first direction on a first substrate 40, and a data line 58 crosses the gate line 42 in a second direction to define a pixel region "P." A thin film transistor "T" is connected to the gate line 42 and the data line 58.

Additionally, a common line 46 is substantially parallel to and spaced apart from the gate line 42. An auxiliary common line 69 is connected to the common line 46 thereon and a plurality of common electrodes 70 extend from the auxiliary common line 69 in the second direction and are located in the pixel region "P."

The pixel line 66 is connected to the thin film transistor "T," a plurality of pixel electrodes 68 extend from the pixel line 66 in the second direction and are located in the pixel region "P." Moreover, each of the common electrodes 70 and each of the pixel electrodes 68 are formed in an alternating pattern.

The pixel line 66, the auxiliary common line 69, the pixel electrode 68, and the common electrode 70 are made of the same material. The material may be, for example, transparent conductive materials.

In FIG. 2B, a black matrix 82 is formed on a second substrate 80 at a boundary of the pixel region "P" shown in FIG. 2A and includes an open portion 81 corresponding to the pixel region "P" (of FIG. 2A).

In addition, a color filter layer 84 is formed in the open portion 81 of the black matrix 82 over the second substrate 80. The color filter layer 84 may include red, green and blue color filters 84a, 84b and 84c, in which each of the red, green and blue color filters 84a, 84b and 84c are located in a corresponding position with reference to the pixel region "P." An overcoat layer 86 is formed on an entire surface of the color filter layer 84 and the black matrix 82 to make the surface of the color filter layer 84 flat. Because the second substrate 80 having a color filter layer 84 in the in-plane switching mode liquid crystal display devices does not include any electrode pattern, the overcoat layer 86 for flattening the surface may be desired on the color filter layer 84.

In FIG. 3, a gate electrode 44 and a common line 46 are formed on a first substrate 40. A gate insulating layer 48 is formed on an entire surface of the gate electrode 44 and the common line 46 over the first substrate 40, and a semiconductive layer 50 is formed on the gate insulating layer 48 over the gate electrode 44.

Additionally, a source electrode 54 and a drain electrode 56 are formed on the semiconductive layer 50, and a data line 58 is formed as one body with the source electrode 54. Moreover, a semiconductive material layer 52 is correspondingly formed with the source electrode 54, the drain electrode 56 and the data line 58 therebelow and is one body with the semiconductive layer 50.

The gate electrode 44, the semiconductive layer 50, the source electrode 54 and the drain electrode 56 form a thin film transistor "T."

A passivation layer 64 is formed over an entire surface of the first substrate 40 including the thin film transistor "T" and includes a drain contact hole 60 that exposes a portion of the drain electrode 56 and a common line contact hole 62 that exposes a portion of the common line 46. The common line contact hole 62 passes through the gate insulating layer 48 and the passivation layer 64 to expose the portion of the common line 46.

A pixel line 66 is formed on the passivation layer 64 and is connected to the drain electrode 56 via the drain contact hole 60. A plurality of pixel electrodes 68 extend from the pixel line 66 and are located in the pixel region "P."

In addition, an auxiliary common line 69 is formed on the passivation layer 64 and is connected to the common line 46 via the common line contact hole 62. Although not shown in FIG. 3, a plurality of common electrodes 70 extend from the auxiliary common line 69 and are located in the pixel region "P." Each of the common electrodes 70 and each of the pixel electrodes 68 are formed in an alternating pattern.

A black matrix 82 is formed on an inner surface of the second substrate 80 shown in FIG. 2B. The black matrix 82 includes the open portion 81 shown in FIG. 2B corresponding to the pixel region "P" (of FIG. 2A). A color filter layer 84 is formed in the open portion 81 of the black matrix 82 over the second substrate 80. The color filter layer 84 includes red, green and blue color filters 84a, 84b and 84c, and each of the red, green and blue color filters 84a, 84b and 84c are located in a corresponding portion of the pixel region "P." An overcoat layer 86 is formed on an entire surface of the color filter layer 84 and the black matrix 82.

A liquid crystal layer 90 is interposed between the first and second substrates 40 and 80 and includes liquid crystal molecules 89 that are driven by a horizontal electric field 88 generated between the pixel electrode 68 and the common electrode 70.

Although not shown in FIG. 3, first and second alignment layers are formed on both surfaces of the first and second substrates 40 and 80 directly contacting the liquid crystal layer 90, respectively.

In the related art, undesired light in the non-pixel region at the boundary of the pixel region is shielded by the black matrix. Accordingly, because the black matrix should be located to correspond with the non-pixel region of the facing substrate to prevent undesired light in the non-pixel region, a line width of the black matrix increases based upon the alignment margin. The alignment margin of the black matrix effects the misalignment of the two substrates that face each other. Therefore, the aperture ratio of the in-plane switching mode liquid crystal display device of the related art decreases.

If the alignment margin value is too small, image quality damage such as contrast ratio and cross talk may be caused by the light leakage phenomenon in the non-pixel region.

SUMMARY OF THE INVENTION

Accordingly, the present invention is directed to an in-plane switching mode liquid crystal display device and method of fabrication that substantially obviates one or more of the problems due to limitations and disadvantages of the related art.

An advantage of the present invention is to provide an in-plane switching mode liquid crystal display device and a fabricating method that can improve image quality and aperture ratio.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device, includes: a gate line on an inner surface of a first substrate; a common line substantially parallel to and spaced apart from the gate line; a data line crossing the gate line to define a pixel region; a thin film transistor connected to the gate line and the data line, the thin film transistor including a gate electrode connected to the gate line, a source electrode connected to the data line, and a drain electrode spaced apart from the source electrode; a first insulating layer to cover an entire surface of the first substrate except the pixel region and portions of the drain electrode and the common line; a first pixel line layer connected to the drain electrode and on a side of the first insulating layer, the first pixel line layer overlapping a portion of an upper surface of the first insulating layer; a first common line layer connected to the common line and on a side of the first insulating layer, the first common line layer overlapping a portion of an upper surface of the first insulating layer; a second insulating layer in a region that is not covered by the first insulating layer, the second insulating layer in the region including the pixel region; a second pixel line layer connected to the first pixel line layer, the second pixel line layer on the second insulating layer, the first and second pixel line layers forming a pixel line; a plurality of pixel electrodes extending from the second pixel line layer in the pixel region, wherein the plurality of pixel electrode are substantially parallel to the data line; a second common line layer connected on the first common line layer, the second common line layer on the second insulating layer, the first and second common line layers forming an auxiliary common line; a plurality of common electrodes extending from the second common line layer in the pixel region, wherein the plurality of common electrodes are substantially parallel to the pixel electrodes, a second substrate facing and spaced apart from the first substrate; and a liquid crystal layer between the first and second substrates.

In another aspect of the present invention, a method of fabricating an in-plane switching mode liquid crystal display device, includes: forming a gate line and a gate electrode connected to the gate line on a first substrate; forming a common line substantially parallel to and spaced apart from the gate line; forming a gate insulating layer on an entire surface of the first substrate including the gate line, the gate electrode, and the common line; forming a data line crossing the gate line to define a pixel region, a source electrode connected to the data line, and drain electrode spaced apart from the source electrode; forming a first insulating layer to cover the entire surface of the first substrate except the pixel region and portions of the drain electrode and the common line; forming a first pixel line layer connected to the drain electrode and on a side of the first insulating layer, the first pixel line layer overlapping a portion of an upper surface of the first insulating layer; forming a first common line layer connected to the common line and on a side of the first insulating layer, the first common line layer overlapping a portion of an upper surface of the first insulating layer; forming a second insulating layer in a region that is not covered by the first insulating layer, the second insulating layer in the region including the pixel region; forming a second pixel line layer connected to the first pixel line layer, the second pixel line layer on the second insulating layer, the first and second pixel line layers forming a pixel line; forming a plurality of pixel electrodes extending from the second pixel line layer and substantially parallel to the data line, the plurality of pixel electrodes being in the pixel region; forming a second common line layer connected on the first common line layer, the second common line layer on the second insulating layer, the first and second common line layers forming an auxiliary common line; forming a plurality of common electrodes extending from the second common line layer in the pixel region, wherein the plurality of common electrodes are substantially parallel to the pixel electrodes, forming a second substrate facing and spaced apart from the first substrate; attaching the first substrate and a second substrate; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5A to 5F and FIGS. 6A to 6F are schematic views showing a fabricating process of an in-plane switching mode liquid crystal display device according to an embodiment of the present invention, in which FIGS. 5A to 5F are plan views, and FIGS. 6A to 6F are cross-sectional views taken along a line "VI—VI" of FIGS. 5A to 5F;

FIG. 7A is a plan view showing a color filter on thin film transistor (COT) type array substrate, and FIG. 7B is a cross-sectional view taken along a line "VII—VII" of FIG. 7A showing the in-plane switching mode liquid crystal display device including a facing substrate and a liquid crystal layer; FIGS. 8A to 8E are plan views, and FIGS. 9A to 9E are cross-sectional views taken along a line "IX—IX" of FIGS. 8A to 8E.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used throughout the drawings to refer to the same or like parts.

Figure 1:
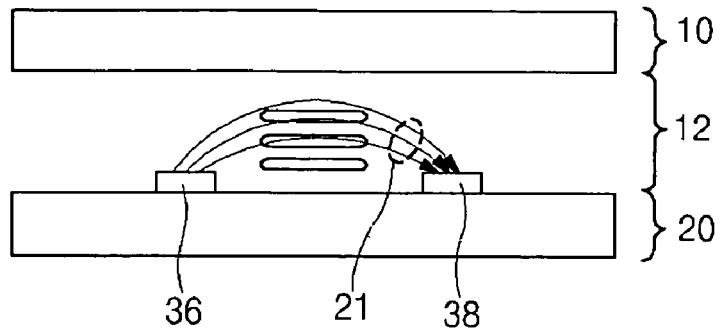
FIG. 1 is a schematic cross-sectional view of an in-plane switching mode liquid crystal display device according to the related art.
Figure 2A:
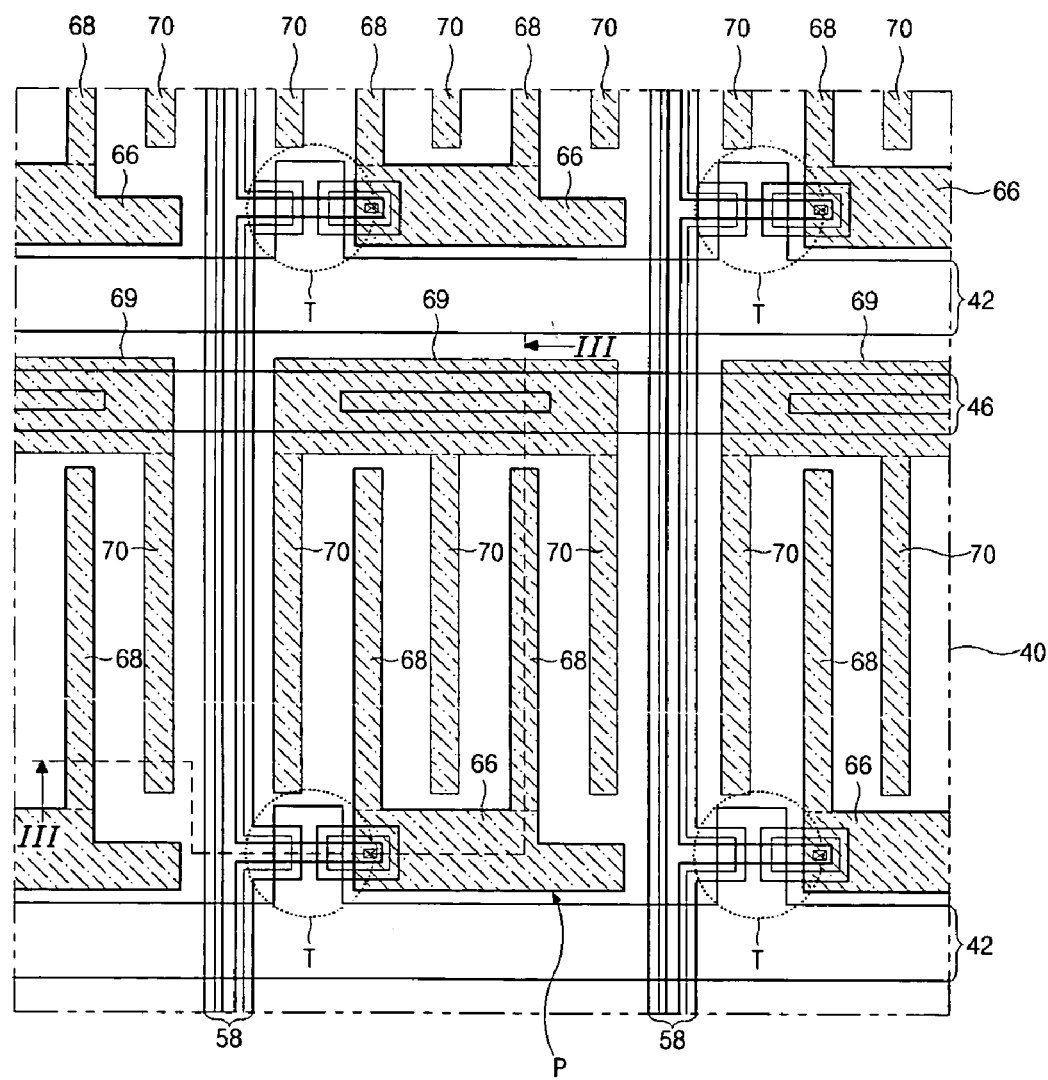
FIG. 2A is a plan view showing an array substrate of an in-plane switching mode liquid crystal display according to the related art.
Figure 2B:
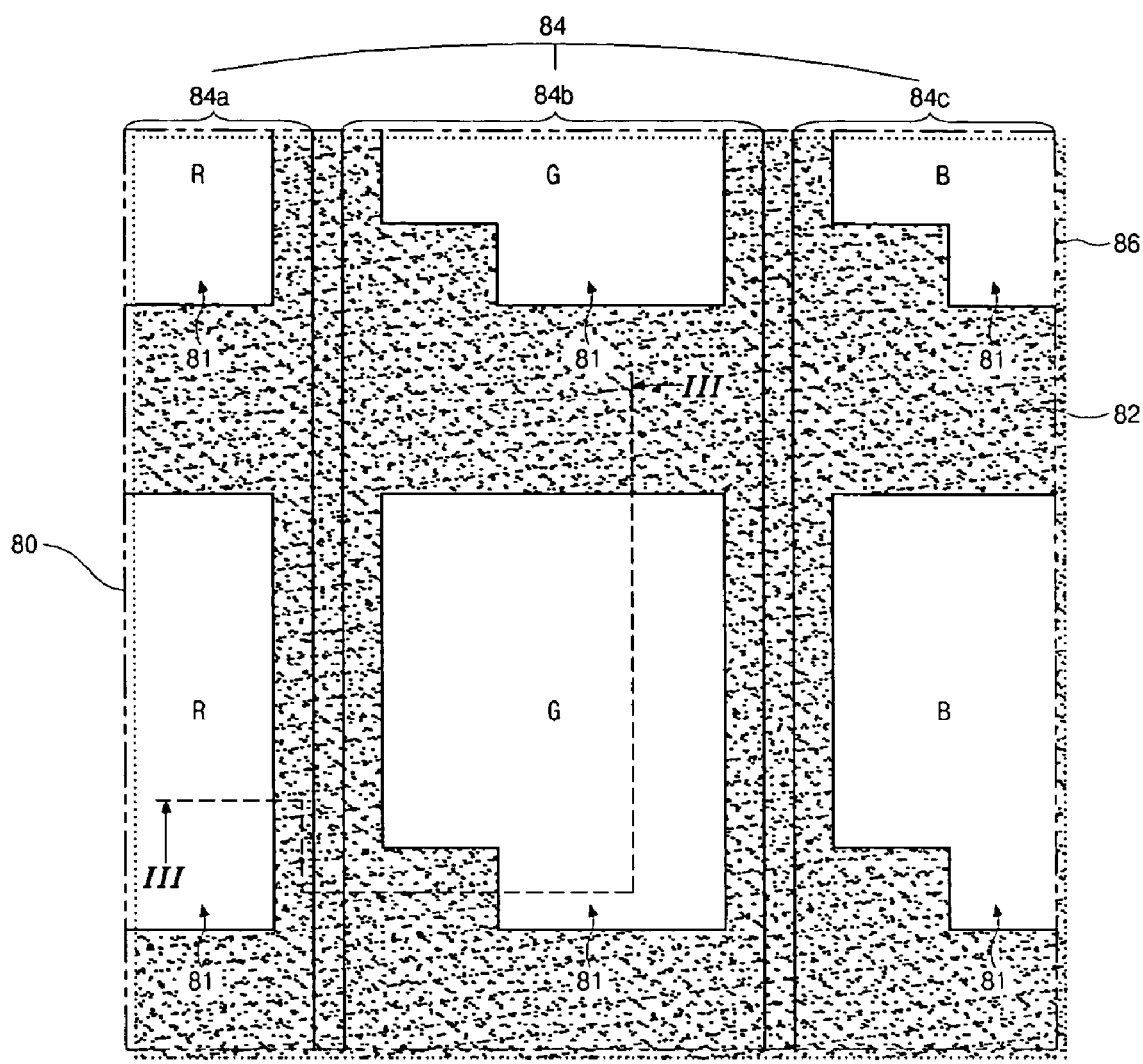
FIG. 2B is a plan view showing a color filter substrate.
Figure 3:
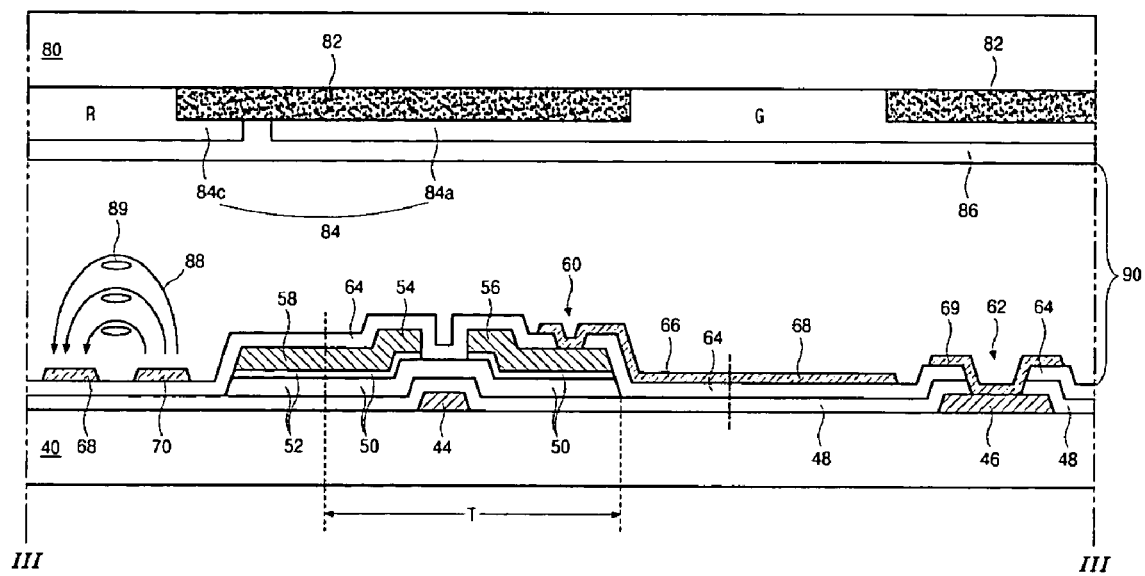
FIG. 3 is a cross-sectional view taken along a line "III—III" of FIGS. 2A and 2B showing the in-plane switching mode liquid crystal display device including a liquid crystal layer therein.
Figure 4A:
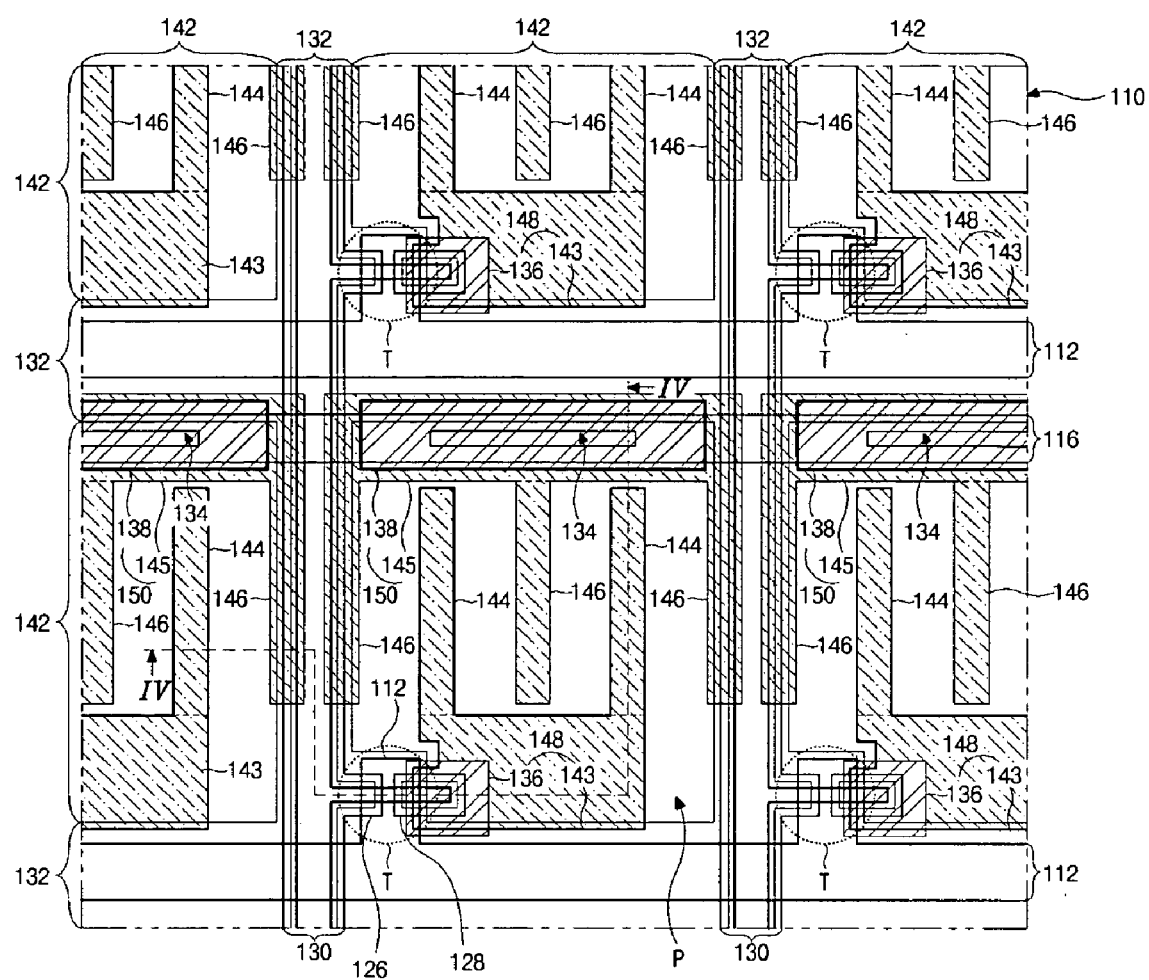
FIG. 4A is a plan view showing an array substrate of an in-plane switching mode liquid crystal display device according to an embodiment of the present invention.
Figure 4B:
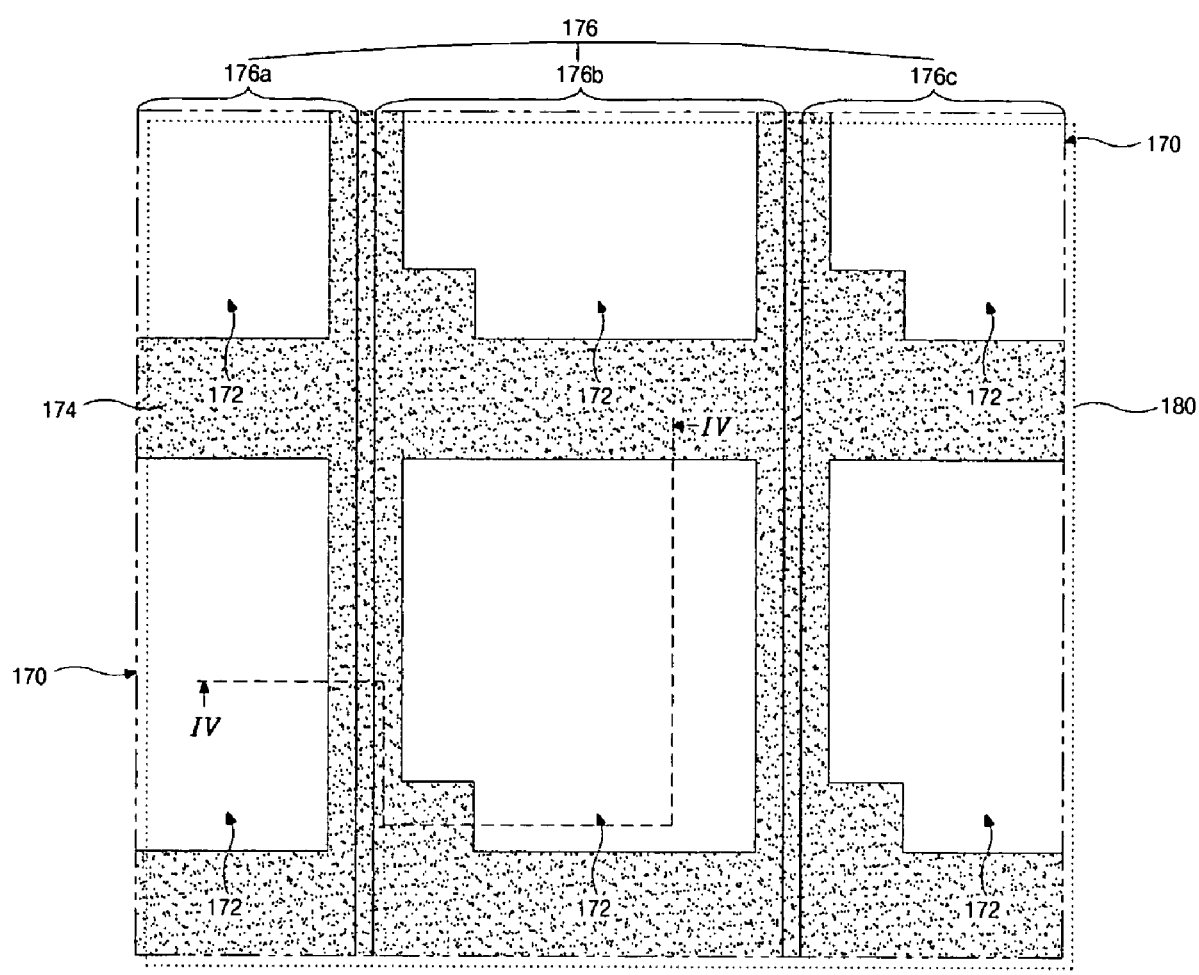
FIG. 4B is a plan view showing a color filter substrate.
Figure 4C:
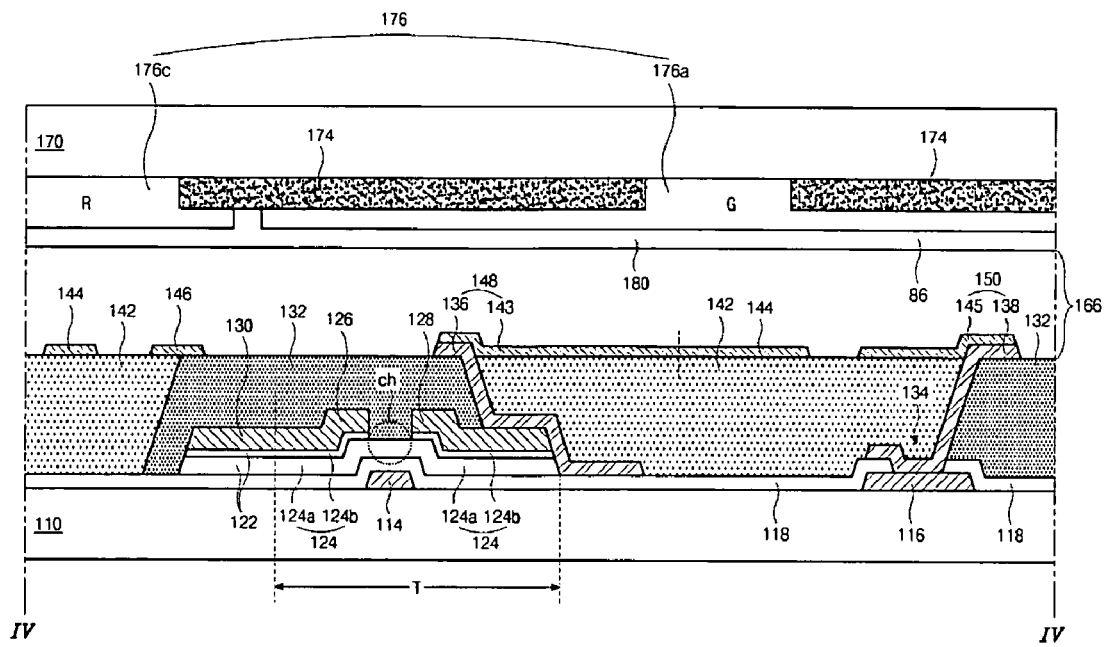
FIG. 4C is a cross-sectional view taken along a line "IV—IV" of FIGS. 4A and 4B showing the in-plane switching mode liquid crystal display device including a liquid crystal layer therein.

FIGS. 4A to 4C are schematic views showing an in-plane switching mode liquid crystal display device according to an embodiment of the present invention. FIG. 4A is a plan view showing an array substrate, FIG. 4B is a plan view showing a color filter substrate. FIG. 4C is a cross-sectional view taken along a line "IV—IV" of FIGS. 4A and 4B showing the in-plane switching mode liquid crystal display device including a liquid crystal layer therein.

Referring to FIG. 4A, a gate line 112 is formed on a first substrate 110 in a first direction, a data line 130 crosses the gate line 112 in a second direction to define a pixel region "P." Common line 116 is substantially parallel to and spaced apart from the gate line 112.

A thin film transistor "T" is connected to the gate line 112 and the data line 130. The thin film transistor "T" includes a gate electrode 114 connected to the gate line 112, a source electrode 126 connected to the data line 130, and a drain electrode 128 spaced apart from the source electrode 126.

A first insulating layer 132 covers the entire surface except the pixel region "P" and portions of the drain electrode 128 and the common line 116. A first pixel line layer 136 is connected to the drain electrode 128 and overlaps a portion of a surface of the first insulating layer 132. A first common line layer 138 is connected to the common line 116 and overlaps a portion of a surface of the first insulating layer 132.

Although not shown in FIG. 4A, the first pixel line layer 136 and the first common line layer 138 are formed along the sides of the first insulating layer 132 and independently have island shapes.

In addition, a second insulating layer 142 is formed in a region that is not covered by the first insulating layer 132. Specifically, the second insulating layer 142 is located in the region including the pixel region "P."

A second pixel line layer 143 is connected to the first pixel line layer 136 and is formed on the second insulating layer 142. Moreover, a plurality of pixel electrodes 144 extend from the second pixel line layer 143 and substantially parallel to the data line 130. They are located in the pixel region "P."

A second common line layer 145 is connected to the first common line layer 138 via a common line contact hole 134 and is located on the second insulating layer 142. Although not shown in Fig. FIG. 4A, a gate insulating layer includes the common line contact hole 134.

A plurality of common electrodes 146 are diverged from the second common line layer 145 and substantially parallel to the pixel electrodes 144. The common electrodes are located in the pixel region "P." Furthermore, each of the common electrodes 146 and each of the pixel electrodes 144 are formed in an alternating pattern.

At least one common electrode 146 in an outermost portion of the common electrodes 146 is closer to the data line 130 than at least one pixel electrode 144 in an outermost portion of the pixel electrodes 144 in each pixel region "P."

Specifically, the first insulating layer 132 includes an insulating material having a high resistance value.

A signal coupling phenomenon between the data line and the electrode adjacent to the data line can effectively be decreased by interposing the first insulating layer having a high resistance value therebetween. Specifically, the aforementioned signal coupling phenomenon may be caused by a data signal voltage and common voltage, or data signal voltage and pixel voltage.

Accordingly, the at least one common electrode 146 at the outermost portion of the common electrodes 146 can overlap a portion of the neighboring data line 130, thereby increasing aperture ratio of the in-plane switching mode liquid crystal display device according to the embodiment of the present invention.

In addition, the second insulating layer 142 includes an insulating material having a high resistance value, specifically, an organic insulating material having a uniform flatness.

Moreover, because the space between the common electrode 146 and the data line 130 is removed by the overlapping structure of the common electrode and the data line, image quality damage due to cross talk in the space in the non-pixel region can be solved in addition, the common electrode 146 and the pixel electrode 144 are all formed on the second insulating layer 142 having a uniform flatness. Thus, the overall flatness of the common electrode 146 and the pixel electrode 144 is improved, thereby obtaining a higher contrast ratio.

In FIG. 4B, a black matrix 174 is formed on a second substrate 170 and includes an open portion 172 corresponding to the pixel region "P" (of FIG. 4A).

In addition, a color filter layer 176 is formed in the open portion 172 of the black matrix 174 over the second substrate 170. The color filter layer 176 includes red, green and blue color filters 176a, 176b and 176c. Each of the red, green and blue color filters 176a, 176 and 176c is located in a corresponding portion of the pixel region "P." An overcoat layer 180 is formed on an entire surface of the color filter layer 176 and the black matrix 174. However, the overcoat layer 180 may not be formed.

Because an area of the open portion 172 has a proportional relationship to the aperture ratio, and the first substrate 170, shown in FIG. 4A, has a high aperture structure, the area of the open portion 172 can be widened to correspond to the high aperture structure.

In FIG. 4C, a gate electrode 114 and a common line 116 are formed on a first substrate 110. A gate insulating layer 118 is formed on an entire surface of the first substrate including the gate electrode 114 and the common line 116. The gate insulating layer 118 has a common line contact hole 134 that exposes a portion of the common line 116.

A source electrode 126 and a drain electrode 128 are formed over the gate insulating layer 118, and a data line 130 is formed as one body with the source electrode 126. A semiconductive layer 124 and a semiconductive material layer 122 correspond to the source electrode 126, the drain electrode 128 and the data line 130 therebelow and are one body.

A semiconductive pattern such as the semiconductive layer 124 and a semiconductive material layer 122 shown in FIG. 4C, and a data pattern such as the source electrode 126, the drain electrode 128 and the data line 130 shown in FIG. 4C may be formed by the same patterning process (e.g., photolithography). However, the patterning process of the semiconductive pattern and the data pattern may be performed in substantially any manner desired.

An active layer 124a and an ohmic contact layer 124b are sequentially formed on the gate insulating layer 118 over the gate electrode 114 and form the semiconductive layer 124. A portion of the active layer 124a is exposed between the source and drain electrodes 126 and 128, and acts as a channel portion "ch."

Although not shown in FIG. 4C, the channel portion "ch" is formed by etching a portion of the ohmic contact layer 124b between the source and drain electrodes 126 and 128.

The gate electrode 114, the semiconductive layer 124, the source electrode 126, and the drain electrode 128 constitute a thin film transistor "T." A first insulating layer 132 is formed to cover the entire surface except the pixel region "P" and portions of the drain electrode 128 and the common line 116.

A first pixel line layer 136 is connected to the drain electrode 128 along with a portion of the first insulating layer 132, and overlaps a portion of a surface of the first insulating layer 132. Accordingly, because the thin film transistor "T" and the pixel electrode 144 are connected to each other by the side contacting, contact damage problems can be solved. A problem occurs when connecting the pixel electrode 144 and the thin film transistor "T" through a contact hole.

For example, the first pixel line layer 136 and the first common line layer 138 are selected from a conductive material having a resistance value within maximum $1 \times 10^6$ Ω·cm, and the conductive material is selected from one of a single material including copper (Cu), chromium (Cr), molybdenum (Mo), titanium (Ti), tantalum (Ta), tungsten (W), and indium tin oxide (ITO), or one of an alloy material including AlTa, AlSi, AlTi, AlNd, CuCr, CuMg, MoW, and MoTa.

Any other material can be used for the conductive material as long as it has the necessary resistance value.

A second insulating layer 142 is formed in a region that is not covered by the first insulating layer 132. That is to say, the second insulating layer 142 is located in the region including the pixel region "P."

A second pixel line layer 143 and a second common line layer 145 are formed on the second insulating layer 142. The second pixel line layer 143 is connected to the first pixel line layer 136, and the second common line layer 145 is connected to the first common line layer 138.

A plurality of pixel electrodes 144 extend from the second pixel line layer 143 and substantially parallel to the data line 130. They are located in the pixel region "P." A plurality of common electrodes 146 extend from the second common line layer and substantially parallel to the pixel electrodes 144. They are located in the pixel region "P." Specifically, each of the plurality of common electrodes 146 and each of the plurality of pixel electrodes 144 are formed in an alternating pattern.

The second pixel line layer 143, the second common line layer 145, the pixel electrodes 144 and the common electrodes 146 may be formed using the same material, for example, of transparent conductive materials including indium tin oxide (ITO), indium zinc oxide (IZO) and indium tin zinc oxide (ITZO). Accordingly, the common electrode 146 and the pixel electrode 144 are located on the same surface having the same surface height.

The first and second common line layers 138 and 145 constitute an auxiliary common line 150, and the first and second pixel line layers 136 and 143 constitute a pixel line 148.

Although not shown in FIG. 4C, an inorganic insulating material including silicon nitride (SiNx) and silicon oxide (SiOx) may be formed between the thin film transistor "T" and the first insulating layer 132 in order to improve a property of the thin film transistor The first insulating layer 132 includes an insulating material having a relative dielectric constant within a maximum value of about 11.0. For example, the first insulating layer 132 may be selected from one of silicon nitride (SiNx), benzocyclobutene (BCB), and photo acryl. In addition, the second insulating layer 142 is made of an insulating material having a resistance value within a minimum of about $1 \times 10^{11}$ $\Omega \cdot cm$. These insulating material includes benzocyclobutene (BCB).

A black matrix 174 is formed on an inner surface of the second substrate 170 show in FIG. 4B. The black matrix 174 includes the open portion 172 (of FIG. 4B) corresponding to the pixel region "P" (of FIG. 4A).

In addition, a color filter layer 176 is formed in the open portion 172 of the black matrix 174 (of FIG. 4B) over the second substrate 170. The color filter layer 176 includes the red, green and blue color filters 176a, 176b and 176c shown in FIG. 4B and each of the red, green and blue color filters 176a, 176b and 176c correspond to the pixel region "P." An overcoat layer 180 is formed on an entire surface of the color filter layer 176 and the black matrix 174.

Because an area of the open portion 172 (of FIG. 4B) has a proportional relationship to the aperture ratio, and the first substrate 110 or array substrate shown in FIG. 4A has a high aperture structure, the area of the open portion 172 (of FIG. 4B) can be widened corresponding to the high aperture structure.

Moreover, a liquid crystal layer 166 is interposed between the first and second substrates 110 and 170. Although not shown in FIG. 4C, first and second alignment layers are formed on both surfaces of the first and second substrates 110 and 170 directly contacting the liquid crystal layer 166, respectively.

FIGS. 5A to 5F and FIGS. 6A to 6F are schematic views showing a fabricating process of an in-plane switching mode liquid crystal display device according to an embodiment of the present invention, FIGS. 5A to 5F are plane views, and FIGS. 6A to 6F are cross-sectional views, which are taken along a line "VI—VI" of FIGS. 5A to 5F.

Figure 5A:
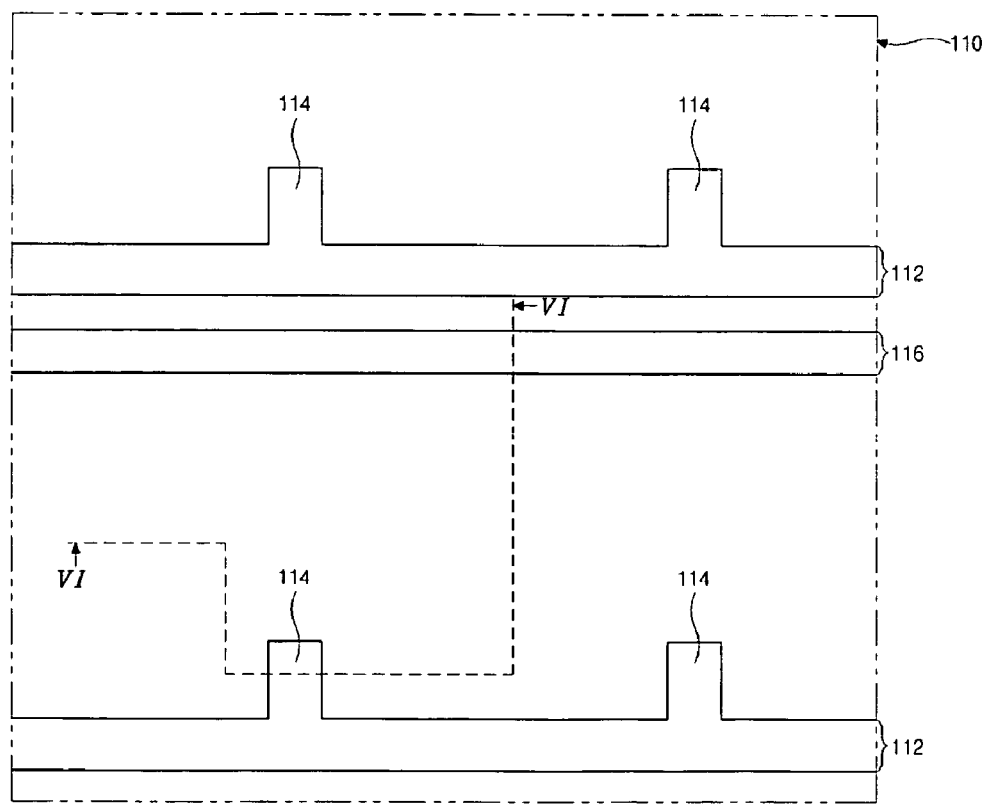
Figure 6A:
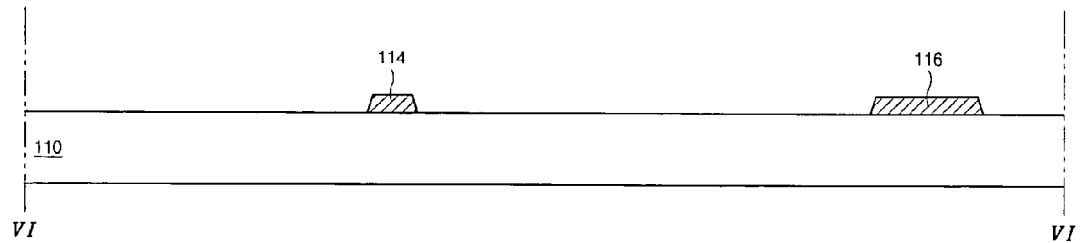

In FIGS. 5A and 6A, a first metal material is deposited on an entire surface of the first substrate 110 shown in FIG. 4C. The first metal material is patterned into a gate line 112 and a common line 116 using a first mask process, which is photolithography using photosensitive material. The gate line 112 and the common line 116 are located in a first direction, and the common line 116 is substantially parallel to and spaced apart from the gate line 112.

A gate electrode 114 extends from the gate line 112. The first metal material may be selected from a metal material having a low specific resistance value.

Figure 5B:
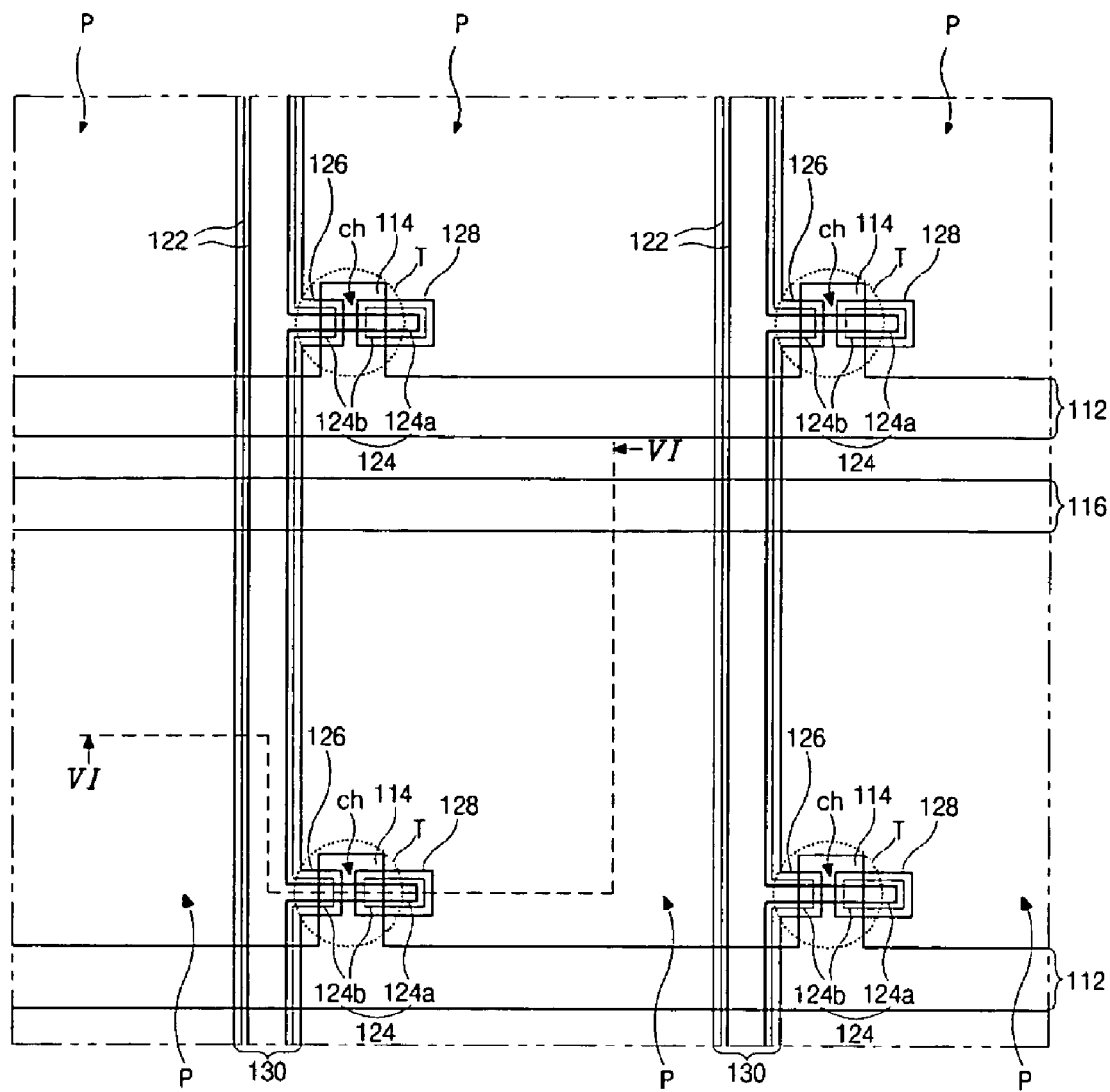
Figure 6B:
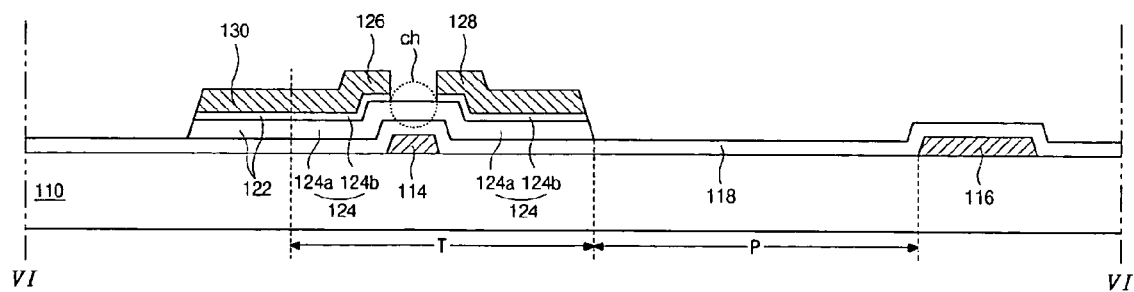

In FIGS. 5B and 6B, a first insulating material, an intrinsic amorphous silicon material, a doped amorphous silicon material and a second metal material are sequentially deposited over an entire surface of the first substrate 110 including the gate line 112, the common line 116 and the gate electrode 114.

The first insulating material is defined as a gate insulating layer 118, and the intrinsic amorphous silicon material, the doped amorphous silicon material and the second metal material are simultaneously patterned into a data line 130, a source electrode 126 and a drain electrode 128 using a second mask process. The data line 130 crosses the gate line 112 in a second direction, the source electrode 126 extends from the data line 130, and the drain electrode 128 is spaced apart from the source electrode 126.

The crossing region of the gate and data lines 112 and 130 is defined as a pixel region "P." The patterned intrinsic amorphous silicon material and the doped amorphous silicon material are correspondently formed with the patterned second metal material and are defined as a semiconductive layer 124 and a semiconductive material layer 122. The semiconductive layer 124 and the semiconductive material layer 122 are one body, the semiconductive layer 124 is located over the gate electrode 114 and includes an active layer 124a and an ohmic contact layer 124b.

The active layer 124a is made of the intrinsic amorphous silicon material, the ohmic contact layer is made of the doped amorphous silicon material. The aforementioned first insulating material may be made of a silicon insulating material selected, for example, from one of silicon nitride $(SiN_x)$ and silicon oxide $(SiO_2)$, or compounding materials thereof.

In addition, a portion of the ohmic contact layer 124b between the source electrode 126 and the drain electrode 128 is etched, and a portion of the active layer 124a therebelow is exposed. The exposed portion of the active layer 124a is defined as a channel portion "ch."

The silicon patterns such as the semiconductive layer 124 and the semi-conductive material layer 122, data patterns such as the data line 130, the source electrode 126 and the drain electrode 128 and the channel portion "ch" are formed using the second mask process without additional mask process. For example, the second mask process may be performed by an exposing method using diffraction. The gate electrode 114, the semi-conductive layer 124, the source electrode 126 and the drain electrode 128 constitute a thin film transistor "T."

Figure 5C:
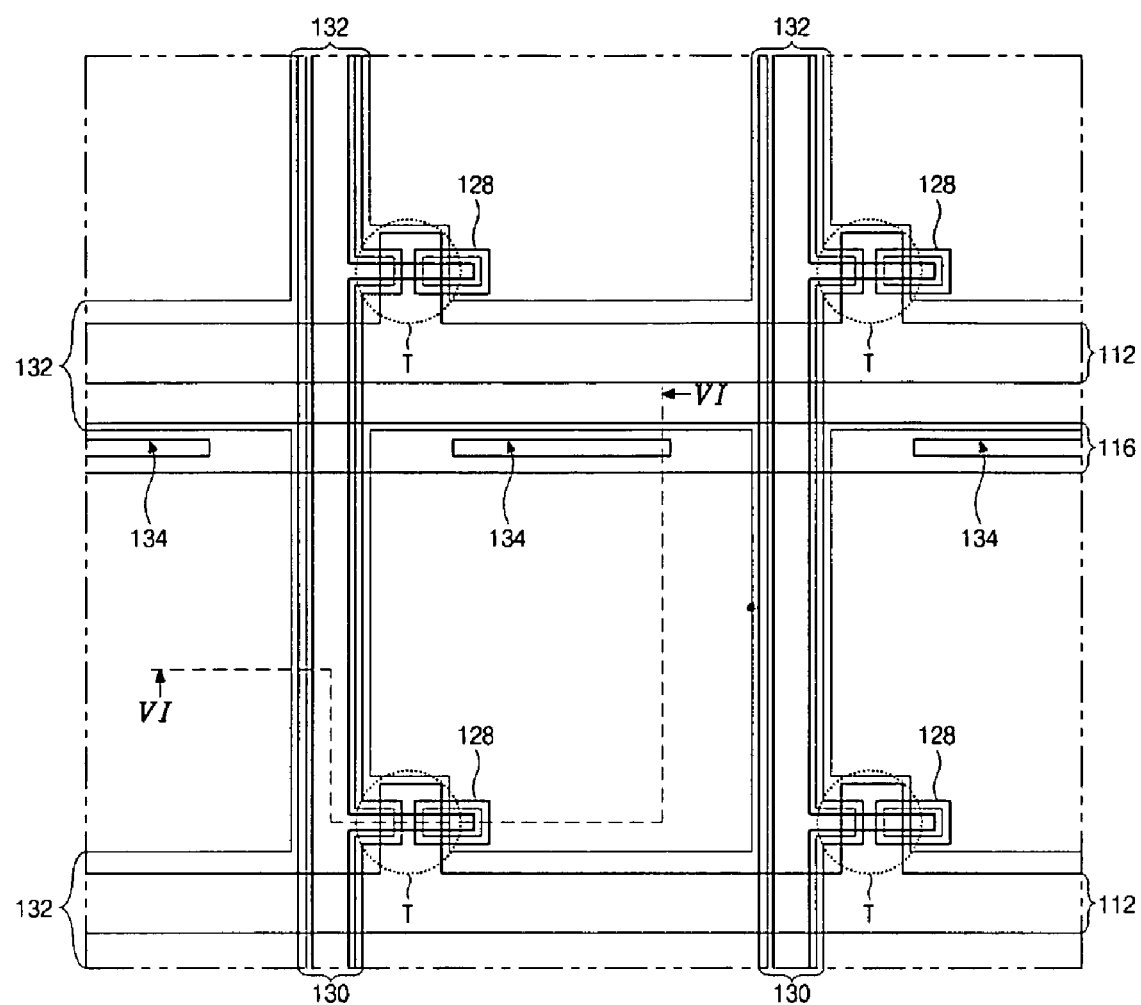
Figure 6C:
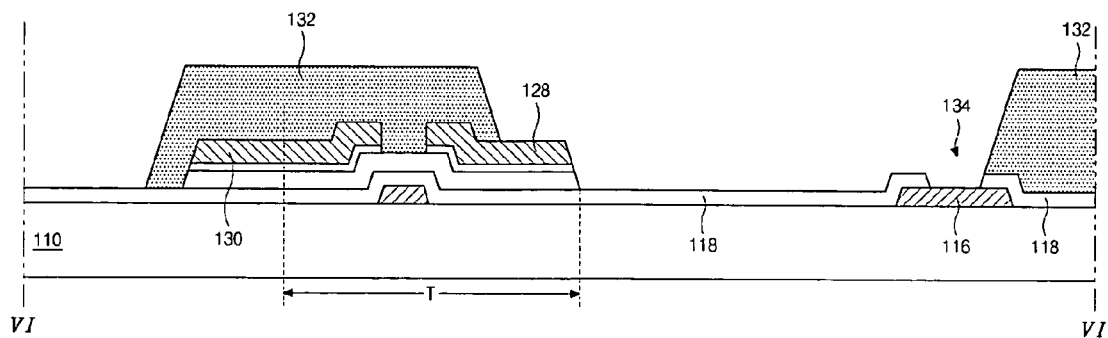

In FIGS. 5C and 6C, a second insulating material is formed over an entire surface of the first substrate 110 including the thin film transistor "T" and is patterned into a first insulating layer 132 using a third mask process. The first insulating layer 132 is formed to cover the entire surface except the pixel region "P" and portions of the drain electrode 128 and the common line 116.

At this time, a common line contact hole 134 that exposes a portion of the common line 116 is formed in the gate insulating layer 118 and corresponds to a portion of the common line 116 not covered by the first insulating layer 132.

The common line contact hole 134 of the gate insulating layer 118 may be simultaneously formed by etching the first insulating layer 132. A dry etching method may be chosen as the etching method. Although not shown in FIGS. 5C and 6C, an inorganic insulating layer such as silicon insulating layer can be formed between the thin film transistor "T" and the first insulating layer 132 to improve a property for the thin film transistor "T."

Figure 5D:
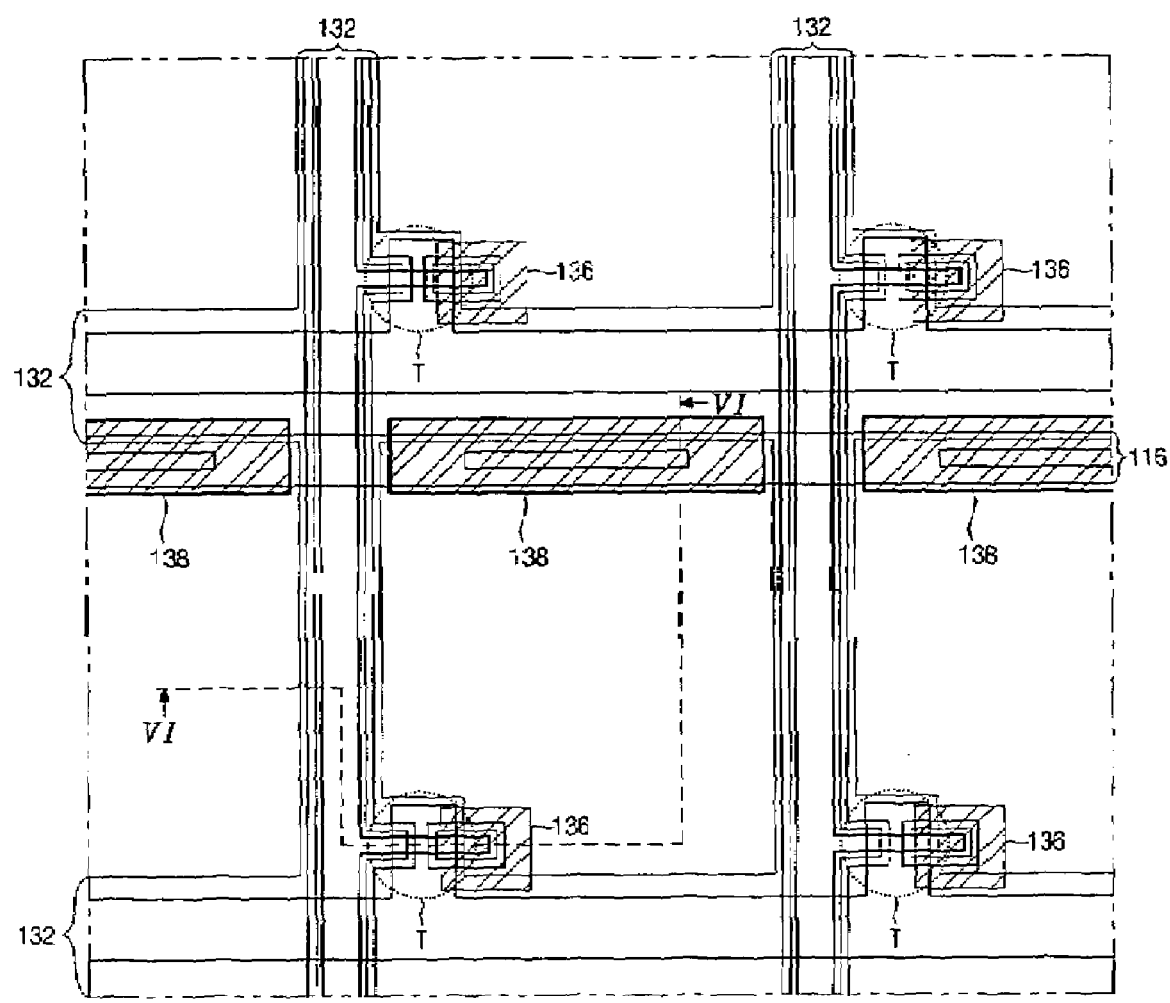
Figure 6D:
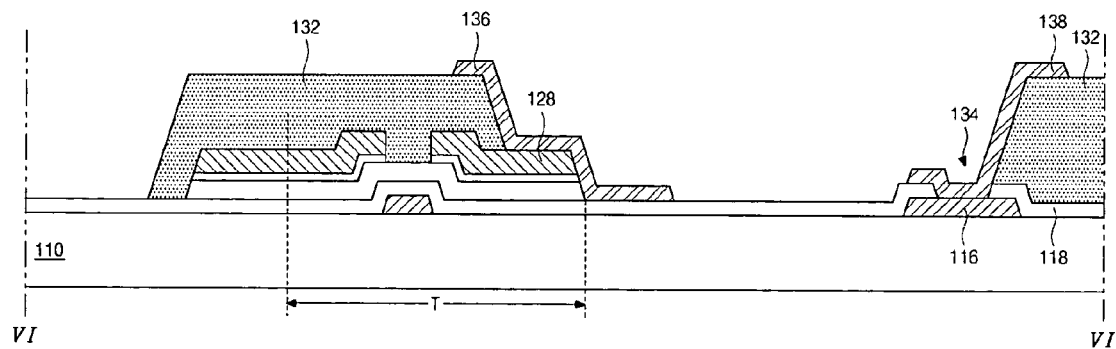

In FIGS. 5D and 6D, a third metal material is deposited on an entire surface of the first insulating layer 132 and is patterned into a first pixel line layer 136 and a first common line layer 138 by a fourth mask process. The first pixel line layer 136 and the first common line layer 138 are formed along a side of the first insulating layer 132 and overlap a portion of an upper surface of the first insulating layer 132. They independently have island shapes.

Specifically, the first pixel line layer 136 is electrically connected to the thin film transistor "T" through the drain electrode 128 without an additional contact hole, and the first common line layer 138 is electrically connected to the common line 116 via the common line contact hole 134.

The third metal material may be selected from a conductive material having a resistance value within a maximum of about $1\times10^6$ Ω·cm and may be selected from one of a single material including copper (Cu), chromium (Cr), molybdenum (Mo), titanium (Ti), tantalum (Ta), tungsten (W), and indium tin oxide (ITO), or one of an alloy material including AlTa, AlSi, AlTi, AlNd, CuCr, CuMg, MoW, and MoTa.

Any other material can be used for the conductive material as long as it has the necessary resistance value.

Because the first pixel line layer 136 and the first common line layer 138 are auxiliary patterns for connecting pixel electrode 144 and common electrode 146 shown in FIG. 4C, and they must be formed within a minimum size range for the electrical connection.

Figure 5E:
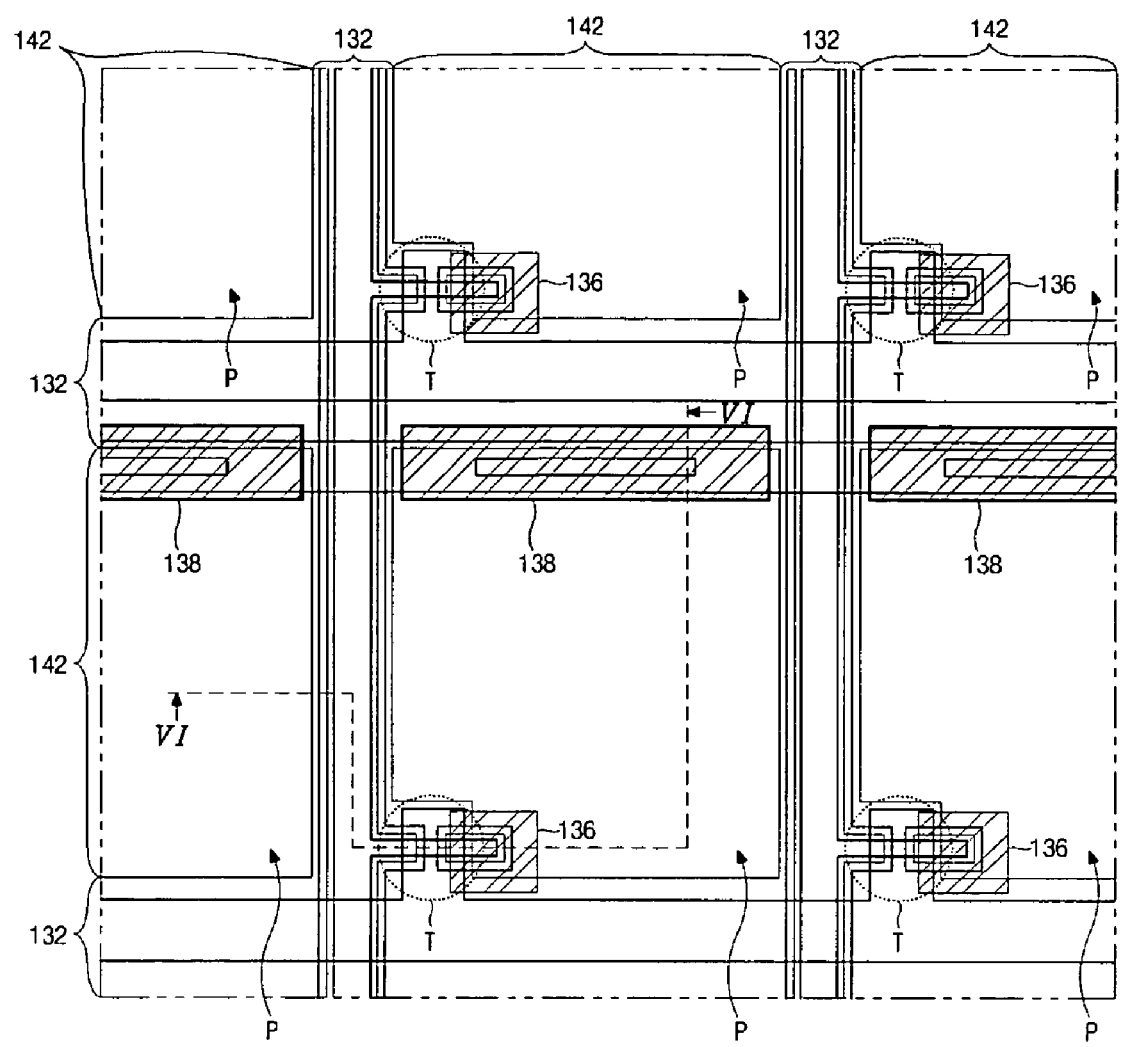
Figure 6E:
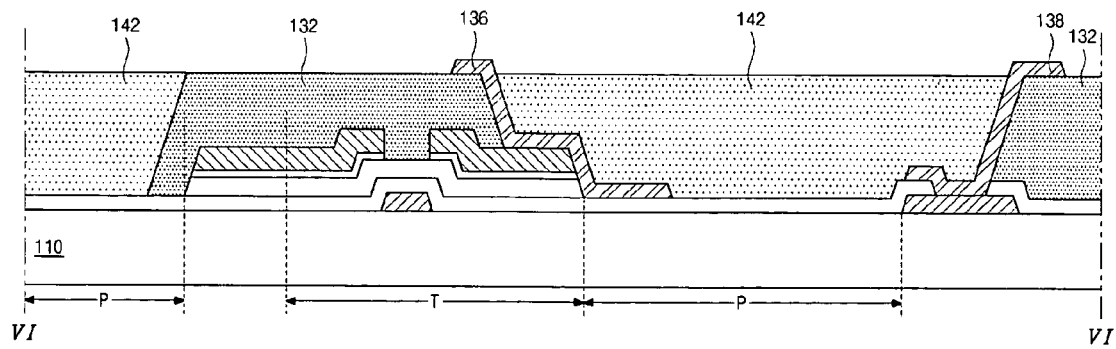

In FIGS. 5E and 6E, a third insulating material is formed over an entire surface of the first substrate 110 including the first pixel line layer 136 and the first common line layer 138 and is patterned into a second insulating layer 142 by a fifth mask process. The second insulating layer 142 is formed in a region that is not covered by the first insulating layer 132. That is to say, the second insulating layer 142 is located in the region including the pixel region "P."

The first and second insulating layers 132 and 142 have the same roughness with each other. Especially, the second insulating layer 142 does not overlap the portions of the first pixel line layer 136 and the first common line layer 138 overlapping the first insulating layers 132.

The third insulating material is made of a insulating material having a high resistance value within a minimum of about $1\times10^{11}$ Ω·cm, specifically, this organic insulating material may be selected from a uniform flatness material, for example benzocyclobutene (BCB).

Figure 5F:
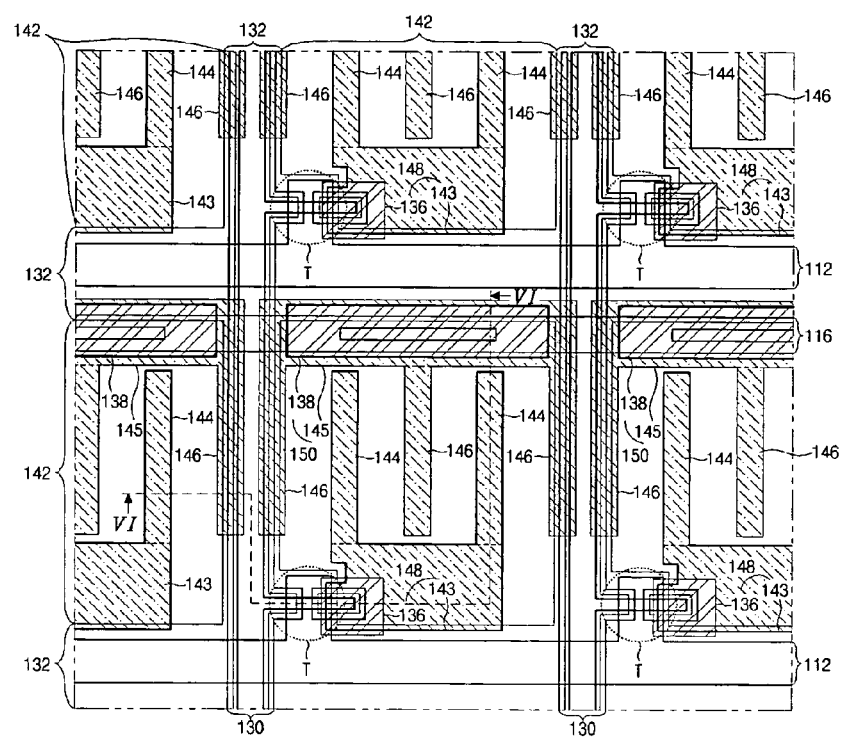
Figure 6F:
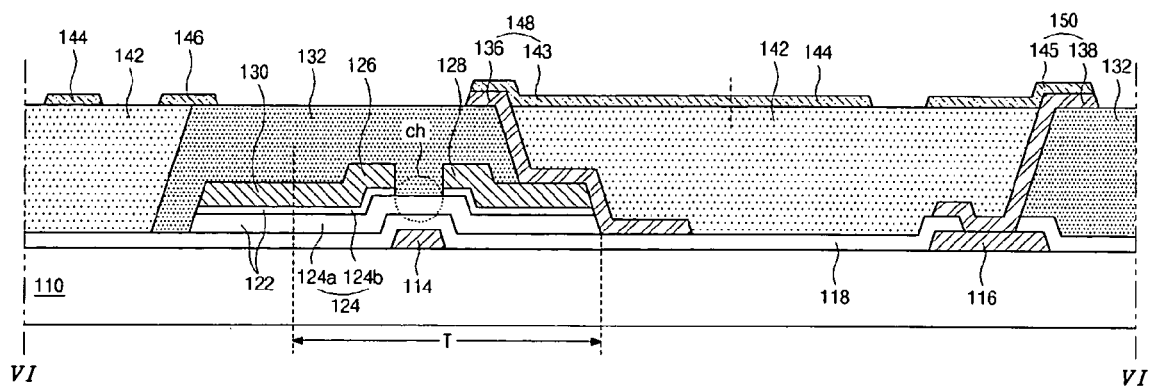

FIGS. 5F and 6F, a fourth metal material is deposited on the second insulating layer 142 and is patterned into a second pixel line layer 143, a second common line layer 145, a plurality of pixel electrodes 144 and a plurality of common electrodes 146 using a sixth mask process. Specifically, the second pixel line layer 143 is connected to the first pixel line layer 136, the plurality of pixel electrodes 144 extend from the second pixel line layer 143 and are substantially parallel to the data line 130. The plurality of common electrodes 146 extend from the second common line layer 145 and are substantially parallel to the pixel electrodes 144. The pixel electrodes and the common electrodes are located in the pixel region "P." Furthermore, the common electrodes 146 and the pixel electrodes 144 are formed in an alternating pattern.

It should be noted that the aforementioned first insulating layer 132 includes insulating material having a high resistance value so that at least one common electrode 146 at an outermost portion of the common electrodes 146 in each pixel region "P" can overlap a portion of the neighboring data line 130.

The first and second common line layers 138 and 145 form an auxiliary common line 150, and the first and second pixel line layers 136 and 143 form a pixel line 148. In addition, the fourth metal material is made of one of transparent conductive materials including indium tin oxide (ITO), indium zinc oxide (IZO) and indium tin zinc oxide (ITZO).

Figure 7A:
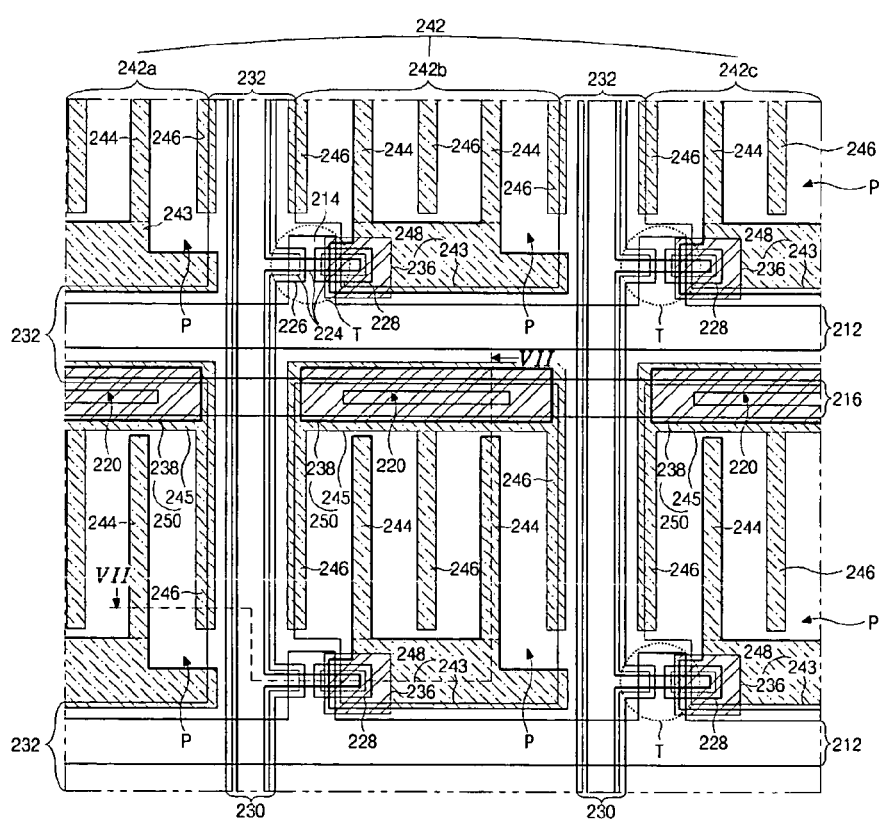
FIGS. 7A and 7B are schematic views showing an in-plane switching mode liquid crystal display device according to an embodiment of the present invention.
Figure 7B:
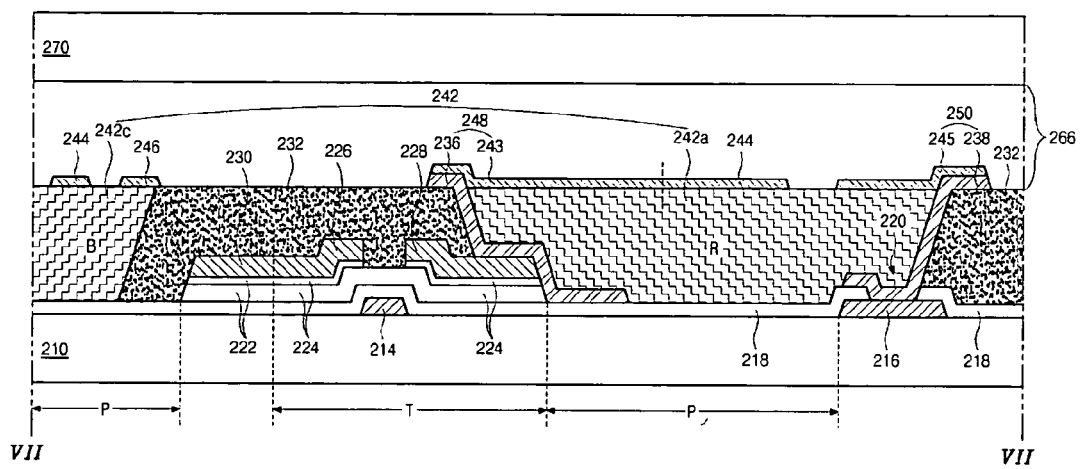

FIGS. 7A and 7B are schematic views showing an in-plane switching mode liquid crystal display device according to an embodiment of the present invention. FIG. 7A is a plan view showing a color filter on thin film transistor (COT) type array substrate, and FIG. 7B is a cross-sectional view taken along a line "VII—VII" of FIG. 7A showing the in-plane switching mode liquid crystal display device including a facing substrate and a liquid crystal layer.

In FIG. 7A, a gate line 212 is formed on a first substrate 210 in a first direction, a data line 230 crosses the gate line 212 in a second direction to define a pixel region "P." A thin film transistor "T" is connected to the gate line 212 and the data line 230. The thin film transistor "T" includes a gate electrode 214 connected to the gate line 212, a source electrode 226 connected to the data line 230, and a drain electrode 228 spaced apart from the source electrode 226.

In addition, a black matrix 232 is formed to cover the entire surface except the pixel region "P" and portions of the drain electrode 228 and the common line 216. A first pixel line layer 236 is connected to the drain electrode 228 and overlaps a portion of a surface of the black matrix 232. A first common line layer 238 is connected to the common line 216 via a common line contact hole 220 and overlaps a portion of a surface of the black matrix 232.

Although not shown in FIG. 7A, the first pixel line layer 236 and the first common line layer 238 are formed along sides of the black matrix 232 and have island shapes.

In addition, a color filter layer 242 is formed in a region that is not covered by the black matrix 232. That is to say, the color filter layer 242 is located in the region including the pixel region "P." The color filter layer 242 includes red, green and blue color filters 242a, 242b and 242c. In addition, each of the red, green and blue color filters 242a, 242b and 242c in each pixel region "P."

The first and second common line layers 238 and 245 constitute an auxiliary common line 250, and the first and second pixel line layers 236 and 243 constitute a pixel line 248.

Because the black matrix 232 and the color filter layer 242 are all formed over the first substrate 210 including the thin film transistor "T," the aperture ratio is increased by eliminating the alignment margin of the black matrix 232, and the contrast ratio is improved by having a uniform flatness of the color filter layer 242.

In FIG. 7B, a gate electrode 214 and a common line 216 are formed on a first substrate 210. A gate insulating layer 218 is formed over an entire surface of the first substrate 210 including the gate electrode 214 and the common line 216 and has a common line contact hole 220 that exposes a portion of the common line 216.

In addition, a source electrode 226 and a drain electrode 228 are formed over the gate insulating layer 218, and a data line 230 is formed as one body with the source electrode 226. A semiconductive layer 224 and a semiconductive material layer 222 are correspondingly formed with the source electrode 226, the drain electrode 228 and the data line 230 therebelow and are one body as shown in FIG. 4C. The gate electrode 214, the semi-conductive layer 224, the source electrode 226 and the drain electrode 228 constitute a thin film transistor "T."

In addition, a black matrix 232 is formed to cover the entire surface except the pixel region "P" and portions of the drain electrode 228 and the common line 216. The exposed portion of the common line 216 corresponds with the common line contact hole 220.

The black matrix is made of an insulating material having a light protecting property. The black matrix 232 includes a portion that exposes the portion of the common line 216 corresponding to the common line contact hole 220 of the gate insulating layer.

A first pixel line layer 236 is connected to the drain electrode 228 along a side of the black matrix 232 and overlaps a portion of a surface of the black matrix 232.

The first pixel line layer 236 and the first common line layer 238 may be selected from a conductive material having a resistance value such as the first pixel line layer 136 and the first common line layer 138 according to the embodiment of the present invention of FIG. 4C.

A color filter layer 242 is formed in a region that is not covered by the black matrix 232. Specifically, the color filter layer 242 is located in the region including the pixel region "P." The color filter layer 242 may include red, green and blue color filters 242a, 242b and 242c. Additionally, each of the red, green and blue color filters 242a, 242b and 242c is located in each pixel region "P."

A second pixel line layer 243 and a second common line layer 245 are formed on the color filter layer 242. The second pixel line layer 243 is connected to the first pixel line layer 236, and the second common line layer 245 is connected to the first common line layer 238.

A plurality of pixel electrodes 244 extend from the second pixel line layer 243 and are substantially parallel to data line 230. A plurality of common electrodes 246 extend from the second common line layer 245 and are substantially parallel to the pixel electrodes 244. The pixel electrodes 244 and the common electrodes 246 are located in the pixel region "P." Specifically, the plurality of the common electrodes 246 and the plurality of the pixel electrodes 244 are formed in an alternating pattern.

For example, the second pixel line layer 243, the second common line layer 245, the pixel electrodes 244 and the common electrodes 246 may be formed using the same material such as the second pixel line layer 143, the second common line layer 145, the pixel electrodes 144 and the common electrodes 146 according to an embodiment of the present invention of FIG. 4C.

The first and second common line layers 238 and 245 constitute an auxiliary common line 250, and the first and second pixel line layers 236 and 243 constitute a pixel line 248.

Although not shown in FIG. 7B, an inorganic insulating material may be formed between the thin film transistor "T" and the black matrix 232.

A second substrate 270 faces and is spaced apart from the first substrate 210. Because the first substrate 210 acts as a COT type array substrate having the black matrix 232, the color filter layer 242 and the common electrode 246, the second substrate 270 does not include a black matrix, a color filter layer and a common line. Accordingly, the black matrix 232 and array element layer (not shown) are formed on the same first substrate 210, thereby increasing aperture ratio by eliminating an alignment margin of the black matrix 232.

A liquid crystal layer 266 is interposed between the first and second substrates 210 and 270. Although not shown in FIG. 7B, first and second alignment layers are formed on both surfaces of the first and second substrates 210 and 270 directly contacting the liquid crystal layer 266, respectively.

FIGS. 8A to 8E and FIGS. 9A to 9E are schematic views showing a fabricating process of an in-plane switching mode liquid crystal display device according to an embodiment of the present invention. FIGS. 8A to 8E are plan views, and FIGS. 9A to 9E are cross-sectional views, which are taken along a line "IX—IX" of FIGS. 8A to 8E.

Figure 8A:
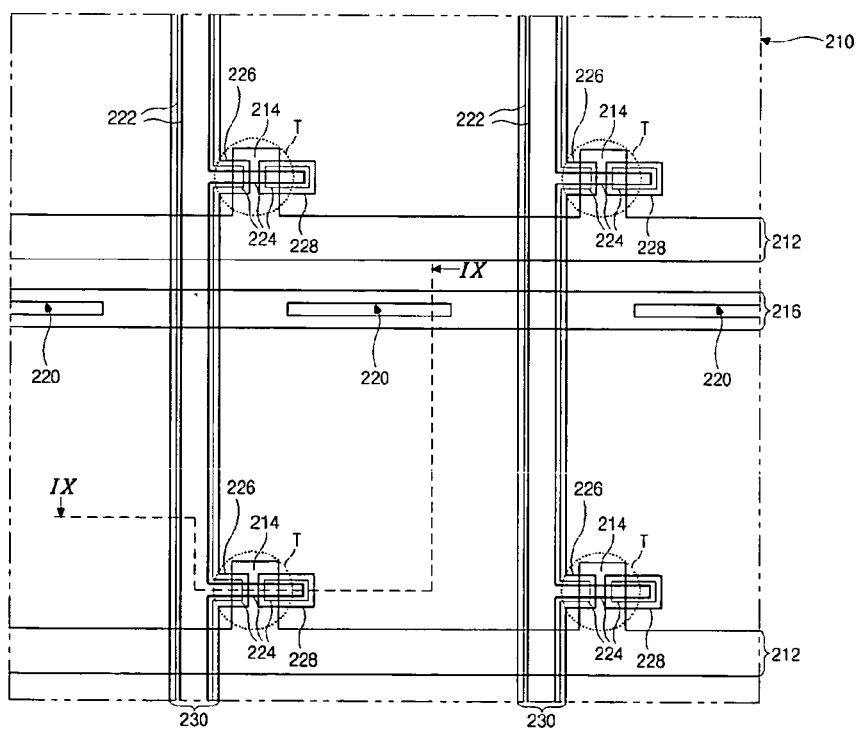
FIGS. 8A to 8E and FIGS. 9A to 9E are schematic views showing a fabricating process of an in-plane switching mode liquid crystal display device according to an embodiment of the present invention.
Figure 9A:
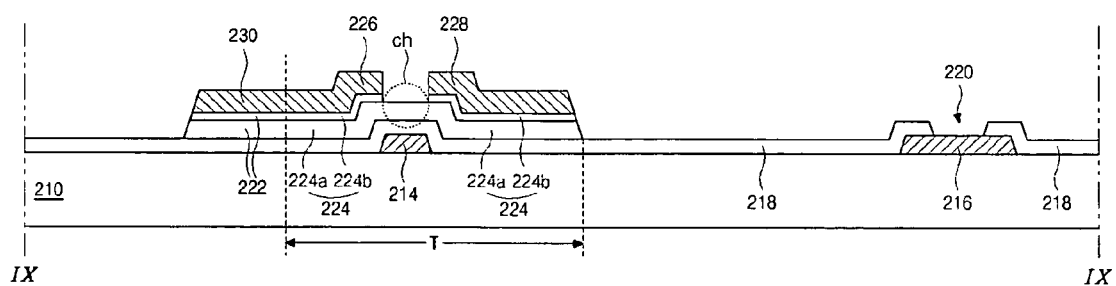

A fabricating method of an in-plane switching mode liquid crystal display device referring to FIGS. 8A and 9A includes forming a gate line 212 and a gate electrode 214 connected to the gate line 212, forming a common line 216 substantially parallel to and spaced apart from the gate line 212, forming a gate insulating layer 218 on an entire surface of the gate line 212, the gate electrode 214, and the common line 216 and having a common line contact hole 220 that exposes a portion of the common line, forming a data line 230 crossing the gate line 212 to define a pixel region "P," a source electrode 226 connected to the data line 230, and drain electrode 228 spaced apart from the source electrode 226, and forming a thin film transistor "T" connected to the gate line 212 and the data line 230, the thin film transistor "T" including the gate electrode 214, the source electrode 226, and the drain electrode 228 spaced apart from the source electrode 226.

In addition, the method further includes sequentially forming an active layer 224a and an ohmic contact layer 224b on the gate insulating layer 218 over the gate electrode 214. The active layer 224a and the ohmic contact layer 224b constitute a semi-conductive layer 224 and the thin film transistor "T" includes the semi-conductive layer 224.

The method further includes forming a channel portion "ch" by etching a portion of the ohmic contact layer 224b between the source and drain electrodes 226 and 228.

Figure 8B:
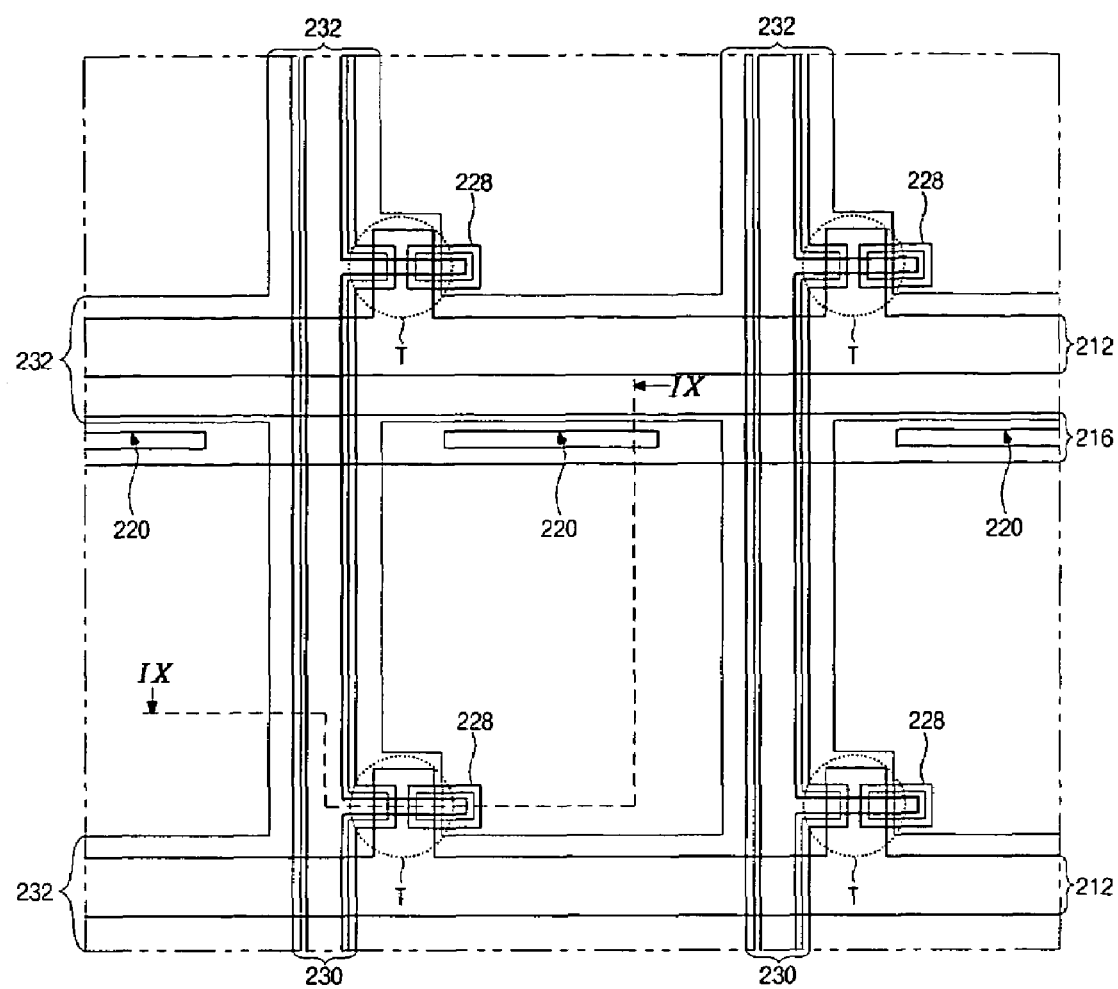
Figure 9B:
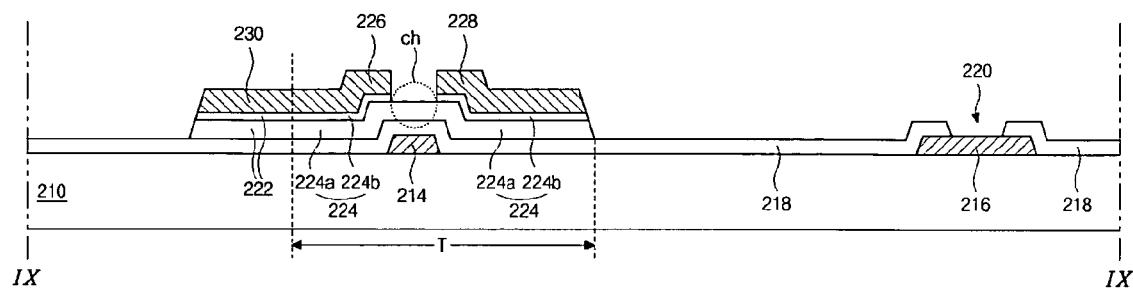

In FIGS. 8B and 9B the fabricating method includes forming a black matrix 232 to cover the entire surface except the pixel region "P" and portions of the drain electrode 228 and the common line 216.

The black matrix 232 is located in the region covering the gate line 212 and the data line 230. Moreover, the region of the black matrix 232 further includes the space between the outermost common electrode 246 in each pixel region "P" and the data line 230, and an edge part of the common electrode 246 adjacent to the date line 230.

The black matrix 232 is made of an insulating material having a light protecting property. For example, the insulating material includes black resin.

Figure 8C:
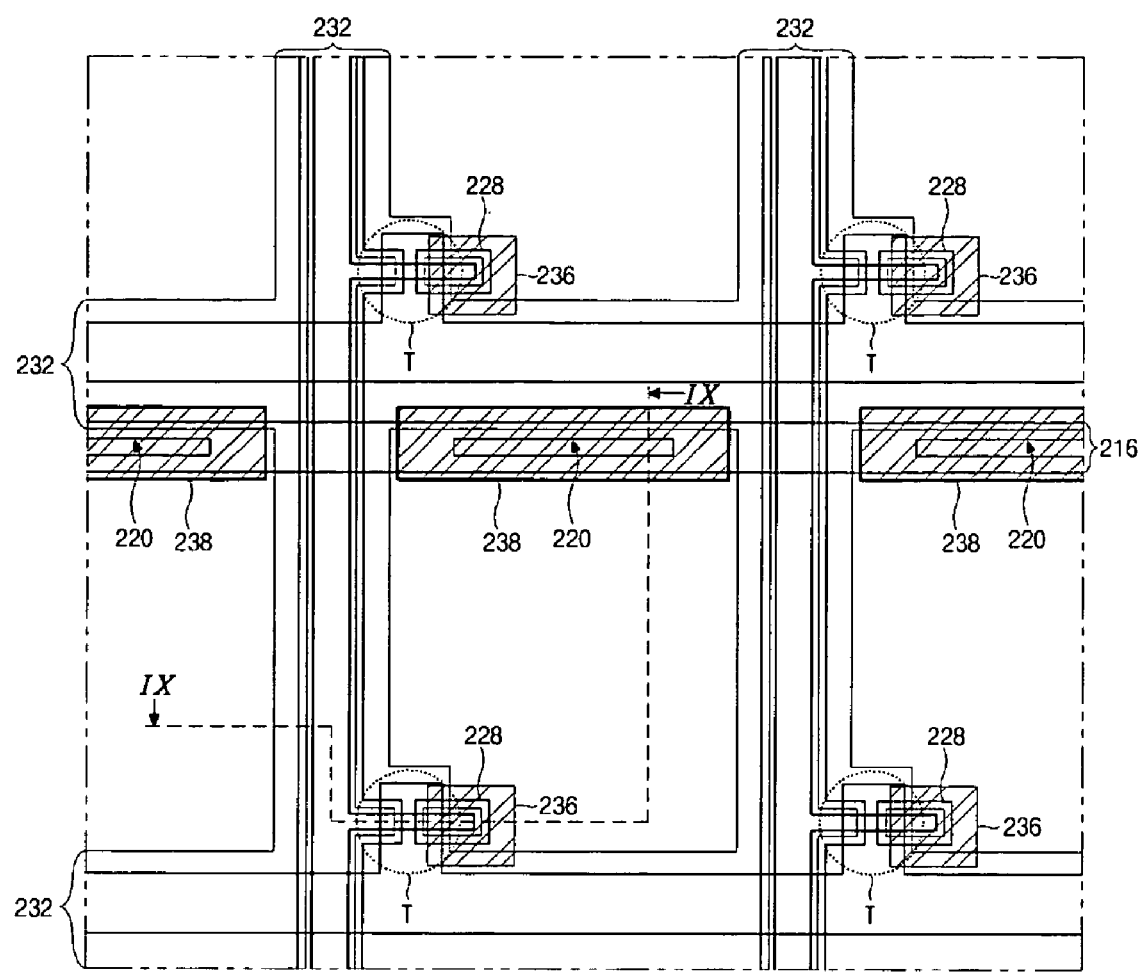
Figure 9C:
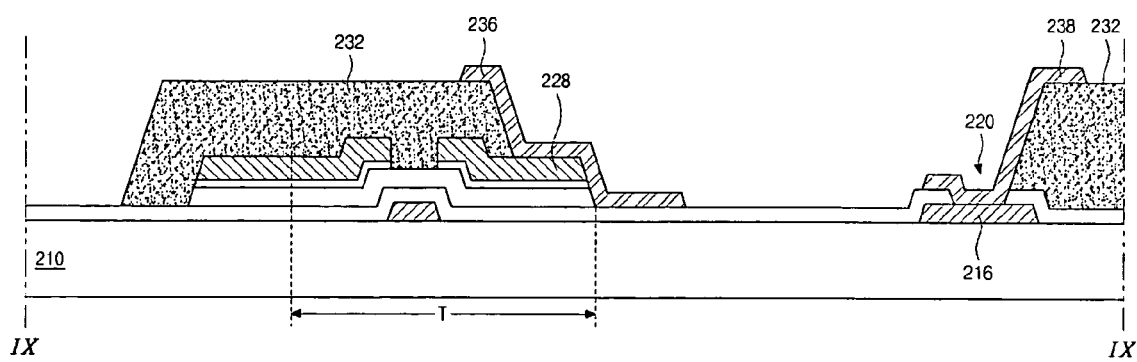

The fabricating method referred to in FIGS. 8C and 9C includes forming a first pixel line layer 236 connected to the drain electrode 228 along a side of the black matrix 232 and overlapping a portion of an upper surface of the black matrix 232, and forming a first common line layer 238 connected to the common line 216 along the black matrix 232 and overlapping a portion of an upper surface of the black matrix 232. The first pixel line layer 236 and the common line layer 238 are made of the same material as the first pixel line layer 236 and the common line layer 238 shown in FIGS. 5F and 6F.

Figure 8D:
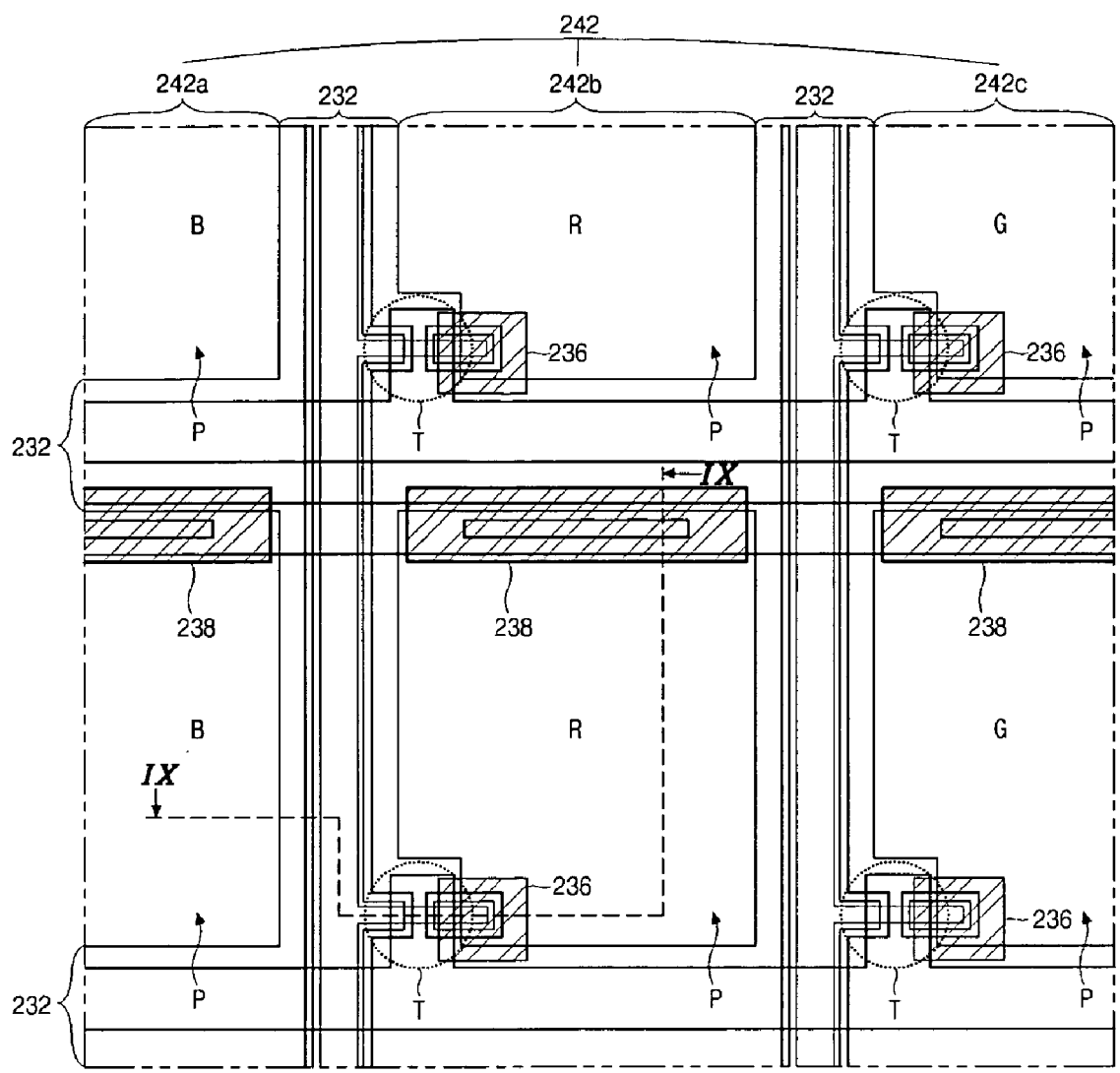
Figure 9D:
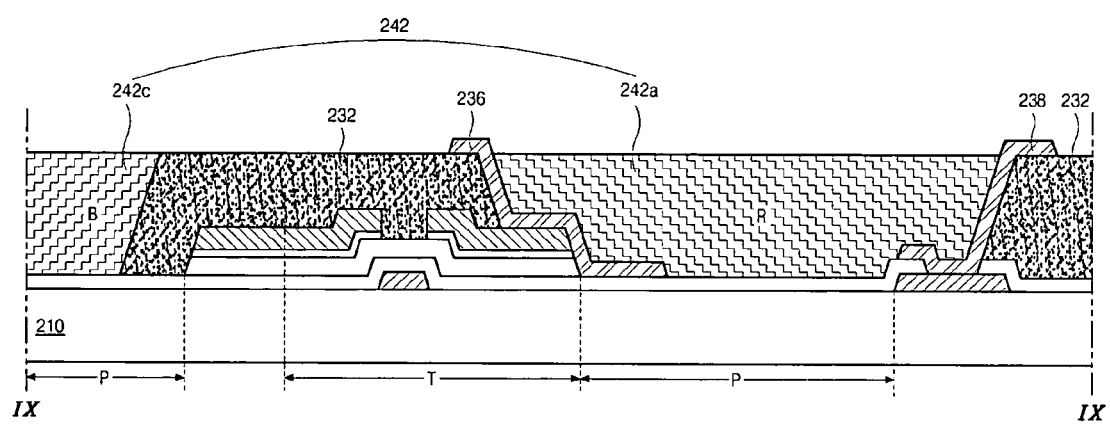

The fabricating method in FIGS. 8D and 9D includes forming a color filter layer 242 in a region that is not covered by the black matrix 232, the color filter layer 242 in the region including the pixel region "P."

The color filter layer 242 includes red, green and blue color filters 242a, 242b and 242c. Each of the red, green and blue color filters 242a, 242b and 242c is located in each pixel region "P." The color filter layer is made of color resins having red, green and blue colors.

Figure 8E:
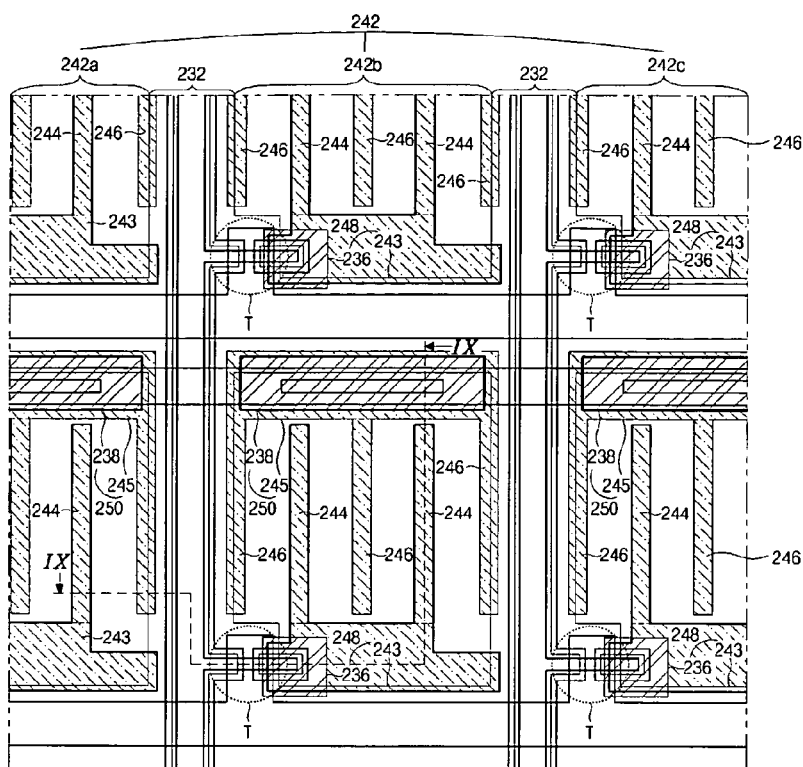
Figure 9E:
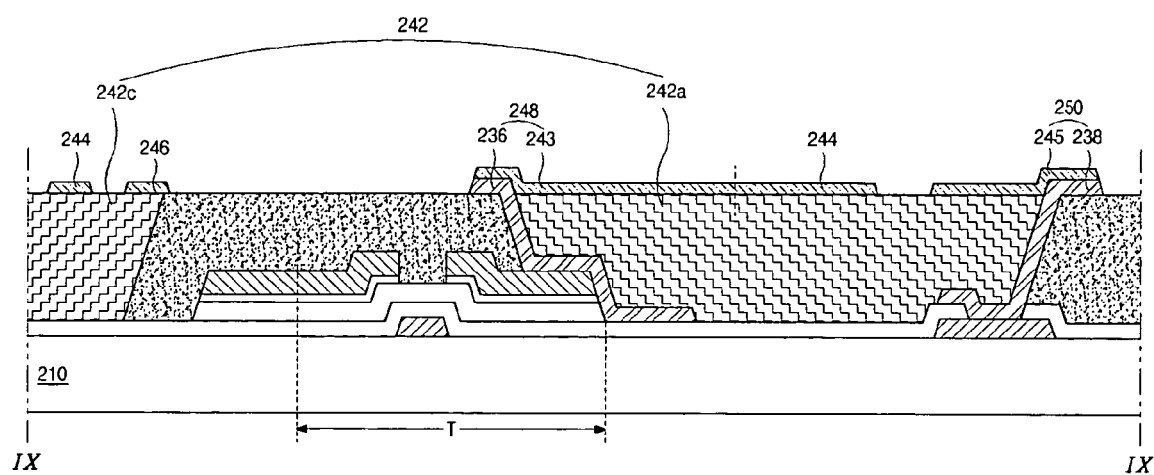

The fabricating method referring to in FIGS. 8E and 9E includes forming a second pixel line layer 243 connected to the first pixel line layer 236 thereon, forming a plurality of pixel electrodes 244 extending from the second pixel line layer 243 and substantially parallel to the data line 230, the plurality of pixel electrodes 244 in the pixel region "P," forming a second common line layer 245 connected on the first common line layer 238, the second common line layer 245 on the color filter layer 242, and forming a plurality of common electrodes 246 extending from the second common line layer 245 and substantially parallel to the pixel electrodes 244. They are located in the pixel region "P."

The first and second common line layers 238 and 245 constitute an auxiliary common line 250, and the first and second pixel line layers 236 and 243 constitute a pixel line 248.

It should be noted that the pixel electrode 244 and the common electrode 246 are simultaneously formed using the same material and are located on the same surface. Furthermore, because the color filter layer 242, having a uniform flatness, is located therebelow, the contrast ratio of the in-plane switching mode liquid crystal display device according to the embodiment of the present invention can be improved.

The second pixel line layer 243, the pixel electrode 244, the second common line layer 245 and the common electrode 246 are made of the same material as mentioned with respect to the second pixel line layer 143, the pixel electrode 144, the second common line layer 145 and the common electrode 146 shown in FIGS. 5F and 6F.

The pixel electrode 244 and the common electrode 246 are formed by connecting of two electrode layer such as first and second pixel line layers, first and second common line layers, and first and second insulating layers 132 and 142 shown in FIG. 4C (or black matrix 232 and the color filter layer 242 shown in FIG. 7B) are interposed therebetween and include a high resistance, so the outermost common electrode 246 adjacent to the data line 230 overlaps the portion of the data line 230. Accordingly, the aperture ratio increases, and cross talk is overcome. Furthermore, because the second insulating layer 142 can be made of organic material having uniform flatness, the contrast ratio of the in-plane switching mode liquid crystal display device according to the present invention can be improved.

According to the other embodiment of the present invention, because the black matrix and color filter layer are formed as the first and second insulating layers, respectively, the aperture ratio of the in-plane switching mode liquid crystal display device according to the present invention can increase more by eliminating the alignment margin of the black matrix.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
   a gate line on an inner surface of a first substrate;
   a common line substantially parallel to and spaced apart from the gate line;
   a data line crossing the gate line to define a pixel region;
   a thin film transistor connected to the gate line and the data line, the thin film transistor including a gate electrode connected to the gate line, a source electrode connected to the data line, and a drain electrode spaced apart from the source electrode;
   a first insulating layer to cover an entire surface of the first substrate except the pixel region and portions of the drain electrode and the common line;
   a first pixel line layer connected to the drain electrode and on a side of the first insulating layer, the first pixel line layer overlapping a portion of an upper surface of the first insulating layer;
   a first common line layer connected to the common line and on a side of the first insulating layer, the first common line layer overlapping a portion of an upper surface of the first insulating layer;
   a second insulating layer in a region that is not covered by the first insulating layer, the second insulating layer in the region including the pixel region;
   a second pixel line layer connected to the first pixel line layer, the second pixel line layer on the second insulating layer, the first and second pixel line layers forming a pixel line;
   a plurality of pixel electrodes extending from the second pixel line layer in the pixel region, wherein the plurality of pixel electrodes is substantially parallel to the data line;
   a second common line layer connected on the first common line layer, the second common line layer on the second insulating layer, the first and second common line layers forming an auxiliary common line;
   a plurality of common electrodes extending from the second common line layer in the pixel region, wherein the plurality of common electrodes is substantially parallel to the pixel electrodes;
   a second substrate facing and spaced apart from the first substrate; and
   a liquid crystal layer between the first and second substrates.

2. The device according to claim 1, wherein the first and second insulating layers include an insulating material having a high resistance value.

3. The device according to claim 2, wherein the first insulating layer includes an insulating material having a relative dielectric constant within a maximum value of about 11.0.

4. The device according to claim 3, wherein the first insulating layer is selected from one of silicon nitride (SiNx), benzocyclobutene (BCB), and photo acryl.

5. The device according to claim 2, wherein the second insulating layer is selected from a insulating material having a resistance value within a minimum value of about $1 \times 10^{11}$ $\Omega \cdot cm$.

6. The device according to claim 5, wherein the insulating material is benzocyclobutene (BCB).

7. The device according to claim 2, wherein at least one common electrode in an outermost portion of the common electrodes is closer to the data line than at least one pixel electrode in an outermost portion of the pixel electrodes for each pixel region, wherein the at least one common electrode overlaps a portion of the data line.

8. The device according to claim 1, wherein surfaces between the first and second insulating layers have a same texture.

9. The device according to claim 1, wherein the first insulating layer includes an insulating material having light protection.

10. The device according to claim 9, wherein the second insulating layer is a color filter layer.

11. The device according to claim 10, wherein the color filter layer includes red, green and blue color filters, wherein the red, green and blue color filters are in each pixel region.

12. The device according to claim 1, wherein the common electrodes and the pixel electrodes include the same material.

13. The device according to claim 1, wherein the gate line and the common line include the same material.

14. The device according to claim 13, further comprising a gate insulating layer on an entire surface of the first substrate including the gate line and the common line, wherein the gate insulating layer directly contacts the gate line and the common line.

15. The device according to claim 14, wherein the gate insulating layer includes a common line contact hole exposing a portion of the common line, wherein the first common line layer is connected to the common line via the common line contact hole.

16. The device according to claim 14, further comprising an active layer and an ohmic contact layer on the gate insulating layer over the gate electrode, the active layer and the ohmic contact layer forming a semiconductive layer, and the thin film transistor includes the semiconductive layer.

17. The device according to claim 1, wherein the first pixel line layer and the first common line layer are selected from a conductive material having a resistance value within a maximum value of about $1 \times 10^6$ $\Omega \cdot cm$.

18. The device according to claim 17, wherein the conductive material is selected from one of a single material including copper (Cu), chromium (Cr), molybdenum (Mo), titanium (Ti), tantalum (Ta), tungsten (W), and indium tin oxide (ITO), and one of an alloy material including AlTa, AlSi, AlTi, AlNd, CuCr, CuMg, MoW, and MoTa.

19. The device according to claim 1, wherein each of the first pixel line layer and the first common line layer are isolated.

20. The device according to claim 1, wherein the second pixel line layer, the pixel electrodes, the second common line layer, and the common electrodes include transparent conductive materials.

21. The device according to claim 1, wherein the first pixel line layer is electrically connected to the drain electrode by side contact.

22. The device according to claim 1, further comprising a black matrix on an inner surface of the second substrate, the black matrix including an open portion in the pixel region.

23. The device according to claim 22, further comprising a color filter layer in the open portion of the black matrix over the second substrate, the color filter layer including red, green and blue color filters, wherein the red, green and blue color filters are in each pixel region.

24. The device according to claim 23, further comprising an overcoat layer on an entire surface of the color filter layer and the black matrix.

25. A method of fabricating an in-plane switching mode liquid crystal display device, comprising:
    forming a gate line and a gate electrode connected to the gate line on a first substrate;
    forming a common line substantially parallel to and spaced apart from the gate line;
    forming a gate insulating layer on an entire surface of the first substrate including the gate line, the gate electrode, and the common line;
    forming a data line crossing the gate line to define a pixel region, a source electrode connected to the data line, and drain electrode spaced apart from the source electrode;
    forming a first insulating layer to cover the entire surface of the first substrate except the pixel region and portions of the drain electrode and the common line;
    forming a first pixel line layer connected to the drain electrode and on a side of the first insulating layer, the first pixel line layer overlapping a portion of an upper surface of the first insulating layer;
    forming a first common line layer connected to the common line and on a side of the first insulating layer, the first common line layer overlapping a portion of an upper surface of the first insulating layer;
    forming a second insulating layer in a region that is not covered by the first insulating layer, the second insulating layer in the region including the pixel region;
    forming a second pixel line layer connected to the first pixel line layer, the second pixel line layer on the second insulating layer, the first and second pixel line layers forming a pixel line;
    forming a plurality of pixel electrodes extending from the second pixel line layer and substantially parallel to the data line, the plurality of pixel electrodes being in the pixel region;
    forming a second common line layer connected on the first common line layer, the second common line layer on the second insulating layer, the first and second common line layers forming an auxiliary common line;
    forming a plurality of common electrodes extending from the second common line layer in the pixel region, wherein the plurality of common electrodes are substantially parallel to the pixel electrodes;
    forming a second substrate facing and spaced apart from the first substrate;
    attaching the first substrate and a second substrate; and
    forming a liquid crystal layer between the first and second substrates.

26. The method according to claim 25, wherein the first and second insulating layers include a insulating material having a high resistance value.

27. The method according to claim 26, wherein the first insulating layer includes an insulating material having a relative dielectric constant within a maximum value of about 11.0.

28. The method according to claim 26, wherein the second insulating layer is selected from a insulating material having a resistance value within a minimum value of about $1 \times 10^{11}$ $\Omega \cdot cm$.

29. The device according to claim 28, wherein the insulating material is benzocyclobutene (BCB).

30. The method according to claim 25, wherein the first insulating layer includes an insulating material having light protection.

31. The method according to claim 30, wherein the second insulating layer is a color filter layer.

32. The method according to claim 31, wherein the color filter layer includes red, green and blue color filters, wherein each of the red, green and blue color filters are in each pixel region.

33. The method according to claim 25, wherein forming the common electrodes and forming the pixel electrodes are the same process and includes the same material.

34. The method according to claim 25, wherein forming the gate line and forming the common line are the same process and includes the same material.

35. The method according to claim 25, wherein the gate insulating layer includes a common line contact hole exposing a portion of the common line wherein the first common line layer is connected to the common line via the common line contact hole.

36. The method according to claim 25, further comprising forming an active layer and an ohmic contact layer on the gate insulating layer over the gate electrode, the active layer and the ohmic contact layer forming a semiconductive layer, and the gate electrode, the semiconductive layer, the source electrode and the drain electrode form a thin film transistor.

37. The method according to claim 25, wherein the first pixel line layer and the first common line layer are selected from a conductive material having a resistance value within a maximum value of about $1 \times 10^6$ Ω·cm.

38. The method according to claim 37, wherein the conductive material is selected from one of a single material including copper (Cu), chromium (Cr), molybdenum (Mo), titanium (Ti), tantalum (Ta), tungsten (W), and indium tin oxide (ITO), and one of an alloy material including AlTa, AlSi, AlTi, AlNd, CuCr, CuMg, MoW, and MoTa.

39. The method according to claim 25, wherein each of the first pixel line layer and the first common line layer are isolated.

40. The method according to claim 25, wherein the second pixel line layer, the pixel electrodes, the second common line layer, and the common electrodes include transparent conductive materials.

41. The method according to claim 25, wherein at least one common electrode in an outermost portion of the common electrodes is closer to the data line than at least one pixel electrode in an outermost portion of the pixel electrodes for each pixel region, wherein the at least one common electrode overlaps the data line.

42. The method according to claim 25, wherein the first pixel line layer is electrically connected to the drain electrode by side contact type.

43. The device according to claim 25, further comprising forming a black matrix on the second substrate, the black matrix including an open portion in the pixel region.

44. The method according to claim 43, further comprising forming a color filter layer in the open portion of the black matrix over the second substrate, the color filter layer including red, green and blue color filters, wherein the red, green and blue color filters are in each pixel region.

45. The method according to claim 44, further comprising forming an overcoat layer on an entire surface of the color filter layer and the black matrix.

* * * * *